United States Patent [19]

Tanii et al.

[11] Patent Number: 5,220,371
[45] Date of Patent: Jun. 15, 1993

[54] FILM CARTRIDGE AND A CAMERA EMPLOYING THE FILM CARTRIDGE

[75] Inventors: Junichi Tanii; Takahisa Shimada; Masaaki Chikasaki; Sadafusa Tsuji; Yoshinobu Kudo, all of Osaka, Japan

[73] Assignee: Minolta Camera Kabushiki Kaisha, Osaka, Japan

[21] Appl. No.: 946,552

[22] Filed: Sep. 17, 1992

Related U.S. Application Data

[63] Continuation of Ser. No. 865,741, Apr. 8, 1992, abandoned, which is a continuation of Ser. No. 701,340, May 9, 1991, abandoned, which is a continuation of Ser. No. 389,869, Aug. 4, 1989, abandoned.

[30] Foreign Application Priority Data

Aug. 5, 1988 [JP] Japan .................. 63-196817
Oct. 22, 1988 [JP] Japan .................. 63-266543
Oct. 25, 1988 [JP] Japan .................. 63-269205
Oct. 25, 1988 [JP] Japan .................. 63-269206

[51] Int. Cl.⁵ .................................... G03B 17/26
[52] U.S. Cl. ...................... 354/212; 354/275; 242/71.1
[58] Field of Search ............... 354/212-215, 354/275; 242/71, 71.1

[56] References Cited

U.S. PATENT DOCUMENTS

| | | | |
|---|---|---|---|
| 2,336,278 | 12/1943 | Mihalyi | 354/212 |
| 2,364,381 | 12/1944 | Mihalyi | 354/212 |
| 2,552,200 | 5/1951 | Mihalyi | 354/275 |
| 2,731,894 | 1/1956 | Leitz et al. | 354/275 |
| 3,463,071 | 8/1969 | Winkler et al. | 354/212 |
| 3,465,659 | 9/1969 | Sato | 354/214 |
| 4,194,822 | 3/1980 | Sethi | 354/275 X |
| 4,221,479 | 9/1980 | Harvey | 354/275 |
| 4,482,232 | 11/1984 | Engelsmann et al. | 354/275 |
| 4,860,041 | 8/1989 | Harvey | 354/212 |

FOREIGN PATENT DOCUMENTS

| | | |
|---|---|---|
| 2732726 | 2/1979 | Fed. Rep. of Germany . |
| 3045240 | 7/1982 | Fed. Rep. of Germany . |
| 55-36828 | 8/1980 | Japan . |

Primary Examiner—David M. Gray
Attorney, Agent, or Firm—Burns, Doane, Swecker & Mathis

[57] ABSTRACT

A film cartridge includes a rewinding shaft for rewinding a film, a case having a film exit/entrance and accommodating the film rewound by the shaft therearound in a light-intercepted condition, and a locking mechanism for locking the leading portion of the film in the film exit/entrance in the vicinity thereof, so that the film does not get out of the cartridge more than a predetermined amount or get out of the exit/entrance carelessly. The shaft or a film feeding-out member in the cartridge is set in a predetermined position, so that the shaft or the member is immediately and smoothly connected with a corresponding member of a camera for accommodating the cartridge. A camera accommodates the cartridge to take the advantage. The camera accommodates the cartridge having a film feeding-out mechanism, a film rewinding mechanism, and a portion for accommodating only the film, so that after the cartridge is accommodated in the camera, each mechanism is suitably and automatically driven to perform a film feeding-out operation or a film rewinding operation.

18 Claims, 19 Drawing Sheets

FILM CARTRIDGE AND A CAMERA EMPLOYING THE FILM CARTRIDGE

This application is a continuation, of application Ser. No. 07/865,741, filed on Apr. 8, 1992, (abandoned), which is a continuation of Ser. No. 07/701,340, filed May 9, 1991 (abandoned), which is a continuation of application Ser. No. 07/389,869, filed Aug. 4, 1989 (abandoned).

BACKGROUND OF THE INVENTION

The present invention relates to a film cartridge comprising a rewinding shaft for rewinding a film and a case having a film exit/entrance and accommodating the film rewound by the shaft therearound in a light-intercepted condition, and a camera in which the cartridge is used.

More particularly, the present invention relates to a film cartridge having a locking mechanism for locking the leading portion of a film in the vicinity of a film exit/entrance and a camera in which the film cartridge is used. Furthermore, the present invention relates to a film cartridge in which the shaft is set in a predetermined position and a camera employing the cartridge. Moreover, the present invention relates to a camera employing a film cartridge having a film feeding-out mechanism and a film rewinding mechanism and more particularly, to a camera employing a film cartridge in which a film winding operation and a film feeding-out operation are performed after the film cartridge is accommodated in a camera body of the camera. The present invention also relates to a film cartridge which is accommodated in a camera body of a camera in which a film rewinding operation and a film feeding-out operation are automatically performed.

In a known 135-type film cartridge, as shown in FIGS. 23 and 24, a predetermined amount of film 8 projects from a film exit/entrance of a film cartridge 2 when the film is not used. When the film cartridge 2 is accommodated in a film cartridge accommodating chamber 10 of a camera body 1, the leading portion 8a of the film 8 which projects from the film cartridge 2 is engaged by an engaging groove 3a formed on a spool 3 of a film driving mechanism provided with the camera body 1.

In the individual cartridges the length of the leading portion 8a of the film 8 projecting out of a film exit/entrance is different for each camera, and in the individual models of the cameras, the distance between the cartridge accommodating chamber 10 and the spool chamber 11 is different for each camera. Therefore, it is required for an operator to adjust the length of the film pulled out of the film exit/entrance of the 135-type film cartridge 2 in order to engage the leading portion of the film with a predetermined portion of a driving mechanism such as a sprocket. Then, it is troublesome to do such an adjusting operation. Moreover, since the film 8 is flexible and has the curly tendency, to curl it is difficult for specially those who are not accustomed in the camera to insert the leading portion 8a of the film 8 into the slots 3a. On the other hand, there is known other types of camera in which the leading portion 8a of the film 8 is automatically connected with the spool 3 by an automatic engaging mechanism in the camera as long as the leading portion 8a thereof is put on the spool 3 In such a camera, it is also required for the operator to adjust the length of the leading portion 8a of the film 8 to set the leading portion 8a thereof to a predetermined position on the spool 3.

In order to solve these problems, there has been proposed a film cartridge in which it is not required to perform the film length adjusting operation and the operation for connecting the film with the spool and it is required to perform only an operation for accommodating in the camera body. For example, as shown in FIG. 25, a film cartridge 50, the 110-type film cartridge, comprises a film winding chamber 50a having a film winding shaft, a spool chamber 50b having a film take-up spool, and a film exposure supporting unit 50c disposed between these chambers 50a and 50b, as disclosed in Japanese Patent Publication No. 51 -14382. In this 110-type film cartridge 50, the leading portion of the film not used is previously connected with the spool. In order to set the camera in the condition in which the photographing operation can be performed, only the following operations are required: a back lid 61 of a camera body 60 is opened, and then the 110-type film cartridge 50 is accommodated in a cartridge accommodating chamber 60a of the camera body 60 before the back lid 61 is closed.

In the 110-type film cartridge 50, the film exposure supporting unit 50c is disposed between the film winding chamber 50a and the spool chamber 50b, and then the film exposure supporting unit 50c is accommodated behind lens in the camera body 60. Therefore, in order to accommodate the film cartridge in the camera body, an extra space is required to arrange the film exposure supporting unit 50c behind the lens in the camera body, as compared with a space for accommodating the 135-type film cartridge 2, resulting in the occurrence of such a problem that the camera can not be freely designed because of large limitation.

Furthermore, since in the 110-type film cartridge 50, the film winding chamber 50a and the spool chamber 50b are forwardly projected from the film exposure supporting unit 50c at both of the right and left sides of the unit 50c, there is no space enough to arrange various devices to the camera body in a position before the unit 50c. That is, for example, it is difficult to arrange a focal-plane shutter or a mirror for observing an object in a single-lens reflex camera before the unit 50c. Therefore, only some limited models or kinds of the camera can employ the 110-type film cartridge.

Moreover, since the 110-type film cartridge 50 extra requires the spool chamber 50b and the film exposure supporting chamber 50c, the film cartridge 50 is bulkier than the 135-type film cartridge 2, resulting in the occurrence of such a problem that a large chamber for accommodating the film cartridge is required.

On the other hand, according to a conventional 135-type film cartridge as shown in FIGS. 23 and 24, the rotational phase position of a film rewinding shaft around which a film 8 not used is rewound is not uniform. When the cartridge 2 is accommodated in a cartridge accommodating chamber 10 of a camera body 1, the rewinding shaft of the cartridge 2 does not immediately engage with a rewinding fork of the camera body 1 in most cases. When the rewinding fork is rotated after the cartridge is accommodated in the cartridge accommodating chamber 10, the rewinding shaft engages with the rewinding fork. As a result, the rotation of the rewinding fork is transmitted to the rewinding shaft, whereby a rewinding operation is performed.

Therefore, according to the above-described construction, it takes a considerable long period of time to accommodate the film cartridge in the cartridge accommodating chamber due to the displacement between the rotational phase position of the rewinding shaft of the cartridge and that of the rewinding fork of the camera body. Further, when the rewinding fork rotates, a malfunction or a failure occurs due to an unfavorable engagement.

SUMMARY OF THE INVENTION

Accordingly, the object of the present invention is to solve the above-described problem and provide a film cartridge which can be easily accommodated in a camera body and a camera in which the above-described film cartridge is used. That is, the object thereof is to provide a film cartridge in which it is unnecessary for the operator to adjust the length of the film getting out of the film exit/entrance after the cartridge is accommodated in the camera and which is not required to arrange an extra space for dislocating the film exposure supporting unit behind the lens as compared with the space for dislocating the conventional 135-type film cartridge, and a camera in which the above-described cartridge is used.

Another object of the present invention is to solve the problems and provide a camera employing a film cartridge less bulkier and composed of a chamber for accommodating only a film, and in with it is not required to arrange an extra space behind the lens, resulting in free designing without large limitation.

Further object of the present invention is to solve the above-described problem and provide a film cartridge capable of rapidly carrying out a film accommodating operation and effectively preventing the occurrence of a malfunction or a failure, and a camera employing the cartridge.

In accomplishing these and other objects, according to the present invention, there is provided a film cartridge comprising: a rewinding shaft for rewinding a film; a case having a film exit/entrance and accommodating the film rewound by the rewinding shaft therearound in a light-intercepted condition; and a locking mechanism, provided in the case for locking the leading portion of the film not used in the vicinity of the film exit/entrance, and releasing the lock according to a lock releasing operation performed from outside the case. Furthermore, there is provided a camera employing the film cartridge, comprising: a film cartridge accommodating chamber, provided with the camera body, for accommodating the film cartridge; and a lock releasing mechanism, provided with the camera body, for releasing the lock of the locking mechanism of the film cartridge accommodated in the film cartridge accommodating chamber.

By the arrangement according to the present invention, the leading portion of the film not used is locked by the locking mechanism in the vicinity of the exit/entrance of the case of the film cartridge and the above-described lock is released according to a lock releasing operation performed from outside the case, whereby the film can be fed out of the film cartridge. According to the above-described arrangement, the leading portion of the film is locked in the vicinity of the exit/entrance of the film cartridge and the film is not moved carelessly with respect to the film cartridge. Accordingly, the film does not get out of the film cartridge more than a predetermined amount or the film does not get into the film cartridge carelessly, whereby it never happens that the film cannot be fed out of the film cartridge. Thus, it is easy to handle the film cartridge and accommodate the film cartridge in the camera body.

In another aspect of the present invention, the film cartridge removably accommodated in a camera body of a camera, comprising: a film rewinding shaft having a first engaging portion capable of engaging with a film rewinding driving member of the camera body and rewinding a film therearound by rotation thereof together with the film rewinding driving member; a film feeding-out member having a second engaging portion capable of engaging with a film feeding-out driving member of the camera body, engaging with the film not used, and feeding out the film by rotation thereof together with the film feeding-out driving member; and a case having a film exit/entrance, rotatably accommodating therein the film rewinding shaft and the film feeding-out member, respectively, and accommodating therein the film rewound around the film rewinding shaft thereby in a light-intercepted condition.

In a further aspect of the present invention, the camera employing a film cartridge which is removably accommodated in a film cartridge accommodating chamber in a camera body of the camera, comprising: a film rewinding shaft, provided in the film cartridge, having a first engaging portion capable of engaging with a film rewinding driving member of the body, and rewinding a film therearound by rotation thereof together with the film rewinding driving member; a film feeding-out member, provided in the film cartridge, having a second engaging portion capable of engaging with a film feeding-out driving member of the body, engaging with the film not used, and feeding out the film by rotation thereof with the film feeding-out driving member; a case, provided in the film cartridge, having a film exit/entrance, rotatably accommodating the film feeding-out member therein, and accommodating therein the film rewound around the film rewinding shaft thereby in a light-intercepted condition; a rewinding driving unit, provided in the camera body, for driving the film rewinding driving member; a film feeding-out driving unit, provided in the camera body, for driving the film feeding-out diving member; and a film chamber, provided in the camera body, for accommodating the film fed out of the film cartridge.

By the arrangements of the present invention, since in the above camera, the film cartridge composed of only a portion for accommodating the film is employed, it is unnecessary to provide with a space for accommodating a film exposure supporting unit of the 110-type film cartridge and a space for accommodating a spool chamber. Therefore, it is not required to provide with an extra space behind the lens L or in the spool chamber, whereby the camera can be freely designed without great limitation of the model and kind of the camera. Since in the above camera, the film cartridge is composed of only a portion for accommodating the film and it is not required to provide with any extra space behind the lens or in the spool chamber similarly to the conventional 135-type film cartridge, the film cartridge accommodating chamber can be smaller in construction as a whole, as compared with the conventional 110-type film cartridge. Since the film cartridge is less bulkier than the conventional 110-type film cartridge, the size of the film cartridge exit/entrance of the camera for employing the film cartridge can be smaller than that of the film -cartridge exit/entrance required for a camera employing the 110-type film cartridge. According to the arrangement of the present invention, since the film cartridge is provided with the film feeding-out member which feeds out the film to the film chamber, only the operation required for the operator to do is to accommodate the film cartridge in the camera body. In feeding out the film from the cartridge, the member is driven by the feeding-out driving portion for feeding out the film, and the film is automatically fed out from the cartridge to the film chamber. Consequently, the operator only accommodates the cartridge in the camera body, and it is unnecessary for the operator to adjust the length of the film by pulling the film out of the cartridge or connect the film with the spool, resulting in no direct contact with the film for the operator. Thus, it is very easy to accommodate the cartridge in the camera body. Further, for example, in such a camera that the film can automatically engage with the spool even the film is pulled to a predetermined position in the spool chamber, only an operation for accommodating the film cartridge in the camera body is performed, whereby the film feeding-out operation for feeding out the film to the spool and the engaging operation for engaging the film with the spool can be automatically performed.

In still further aspect of the present invention, the camera employing a film cartridge which is removably accommodated in a film cartridge accommodating chamber in a camera body of the camera, comprising: a film rewinding shaft, provided in the film cartridge, having a first engaging portion capable of engaging with a film rewinding driving member of the body, and rewinding a film therearound by rotation thereof together with the film rewinding driving member; a film feeding-out member, provided in the film cartridge, having a second engaging portion capable of engaging with a film feeding-out driving member of the body, engaging with the film not used, and feeding out the film by rotation thereof with the film feeding-out driving member; a case, provided in the film cartridge, having a film exit/entrance, rotatably accommodating the film feeding-out member therein, and accommodating therein the film rewound around the film rewinding shaft thereby in a light-intercepted condition; a rewinding driving unit, provided in the camera body, for driving the film rewinding driving member; a film feeding-out driving unit, provided in the camera body, for driving the film feeding-out diving member; and a film chamber, provided in the camera body, for accommodating the film fed out of the film cartridge.

By the arrangement of the present invention, since the rewinding shaft of the film cartridge is set to take the predetermined phase position, the rotational phase position of the rewinding shaft becomes constant and it is easy to connect the rewinding shaft to the rewinding driving portion of the camera body. Further, the rewinding driving portion of the camera body is also set to take a predetermined phase position correspondingly to the predetermined phase position of the rewinding shaft. When the film cartridge is accommodated in the film cartridge accommodating chamber in this condition, the phase position of the rewinding shaft and that of the driving portion coincide with each other. Accordingly, a film cartridge accommodating operation can be accomplished at a fast speed and further, a malfunction and a failure can be efficiently prevented from occurring.

In the film cartridge provided with the feeding-out member, similarly to the above, the same advantage as the above can be obtained by setting the phase position of the feeding-out member to take a predetermined phase position. Further, in the camera body provided with the feeding-out driving portion, the same advantage can also be obtained by setting the predetermined phase position of the driving portion correspondingly to the predetermined phase position of the feeding-out member.

BRIEF DESCRIPTION OF THE DRAWINGS

These and other objects and features of the present invention will become clear from the following description taken in conjunction with the preferred embodiments thereof with reference to the accompanying drawings, in which:

FIGS. 7 (b) and 7 (c) are enlarged views of gears 111 and 110, respectively;

DETAILED DESCRIPTION OF THE PREFERRED EMBODIMENTS

Figure 1:
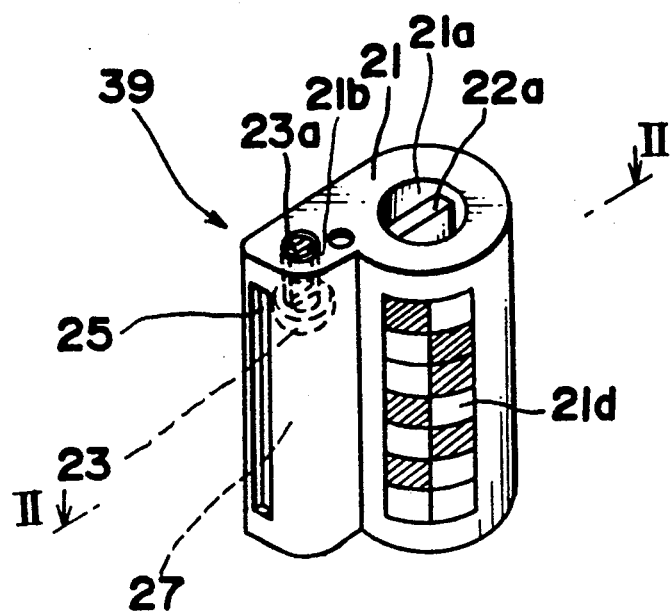
FIG. 1 is a perspective view of one embodiment of a film cartridge to be used in a camera employing a film cartridge in accordance with the present invention.

Before the description of the present invention proceeds, it is to be noted that like parts are designated by like reference numerals throughout the accompanying drawings.

Figure 2:
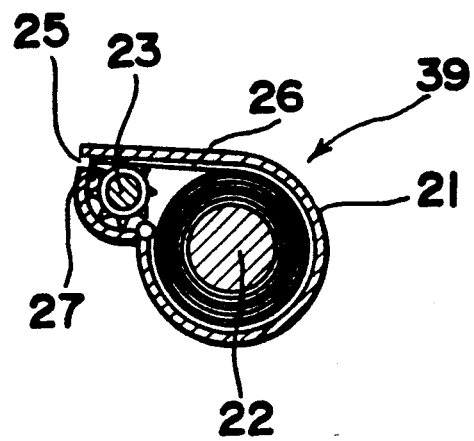
FIG. 2 is a transverse sectional view taken along the line II—II of FIG. 1.

As shown in FIGS. 1 and 2, a film cartridge 39 of the embodiment essentially comprises a film rewinding shaft 22 around which a film 26 not used is wound; a sprocket 23 serving as a film feeding-out member which rotates in engagement with perforations 26a (see FIG. 3) of the film 26; and a case 21 having a film exit/entrance 25, accommodating the film rewinding shaft 22 and the sprocket 23 adjacent to each other and rotatable and accommodating the film 26 in a light-intercepted condition.

Figure 3:
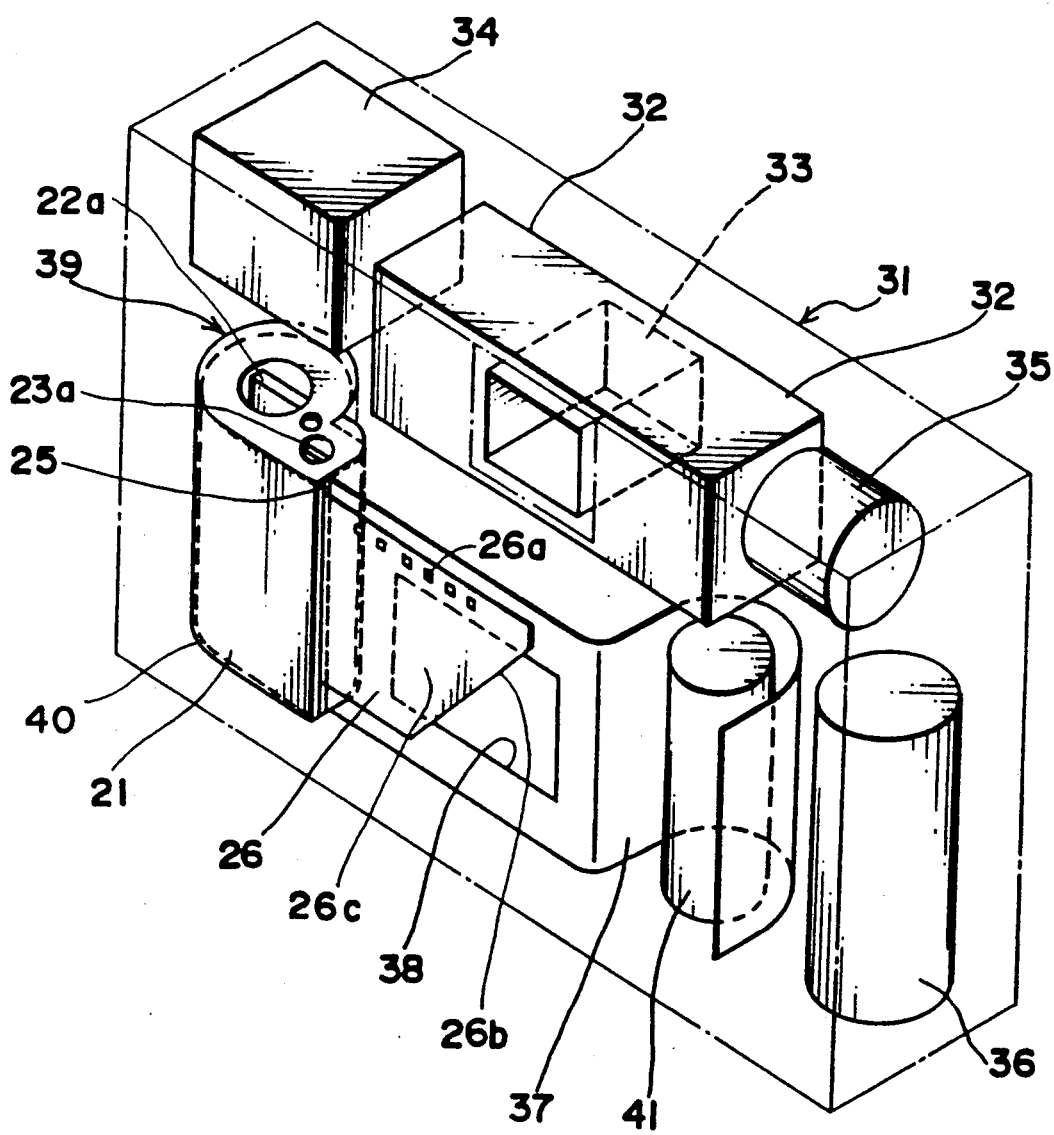
FIG. 3 is a schematic illustration of the abovedescribed camera in which the above-described film cartridge is accommodated in the film cartridge accommodating chamber of the camera body and thereafter, the leading portion of a film is fed out of the film exit/entrance of the film cartridge case.

As shown in FIG. 3, the film 26 contained in the film cartridge 39 has the perforations 26a formed in a row close to and along one side edge of the film, namely, only on the upper edge thereof of which each engages with the engaging claw of the sprocket 23. In the leading portion 26c of the film 26, the lower portion is greatly cut off, that is, an inclined edge 26b which inclines with respect to the width direction of the film 26 is formed on the leading portion 26c of the film 26, whereby when the leading portion of the film 26 is fed out of the exit/entrance 25 of the case 21 of the film cartridge 39, the upper edge of the film 26, namely, the side on which the perforations 26a are formed reaches a spool chamber 37 ahead of the lower edge thereof.

According to the above-described construction, when the leading portion 26c of the film 26 is fed out of the exit/entrance 25, the inclined edge 26b is not prevented from being engaged with the end portion of an exposure aperture across which the film 26 is transported and the upper edge of the film 26, namely, the side on which the perforation 26a is formed reaches the spool chamber 37 ahead of the lower edge thereof. Thus, the film 26 is smoothly transported toward the spool chamber 37.

Inside the case 21, a light intercepting member 27 which is flexible and closes the exit/entrance 25 to prevent the film 26 from being exposed is formed along the exit/entrance 25. The light intercepting member 27 is bent outward from the exit/entrance 25 by the leading portion 26c of the film 26 when the film 26 is fed out of the case 21 by the sprocket 23. In the condition in which the film 26 has not been used, the perforations 26a of the leading portion 26c of the film 26 are engaged by the engaging claws of the sprocket 23, but the leading portion 26c of the film 26 is not disposed out of the exit/entrance 25.

In FIG. 1, a large opening 21a and a small opening 21b are formed on the upper surface of the case 21, and a first engaging portion 22a disposed on the upper portion of the film rewinding shaft 22 is exposed to the outside of the large opening 21a, and a second engaging portion 23a disposed on the upper portion of the sprocket 23 is exposed to the outside of the small opening 21b. The first engaging portion 22a is capable of engaging with a film rewinding driving member (not shown) of a camera body 31, and the second engaging portion 23a is capable of engaging with a film feeding-out driving member (not shown) of the camera body 31. The case 21 has on the peripheral surface thereof film data 21d which indicate information such as the number of photographable frames and a film sensitivity. The number of the photographable frames is read by the camera and then, recorded in a microcomputer COM of the camera body 31 as the total number of perforations formed on the upper edge of the film 26.

A camera capable of employing the film cartridge 39 is shown in FIG. 3. FIG. 3 is a conceptual view showing the condition in which the film cartridge 39 is accommodated in a film cartridge accommodating chamber 40, and the leading portion 26c of the film 26 has been fed out of the film exit/entrance 25. In FIG. 3, the camera comprises an automatic focusing block 32, a view finder block 33, an electronic flash 34, a flashlight emitting capacitor 35, a battery 36, the spool chamber 37, a spool 41, and an aperture (exposure opening) 38.

According to this camera, when the film cartridge 39 is accommodated in the film cartridge accommodating chamber 40, the first engaging portion 22a is connected to the film rewinding driving member and the second engaging portion 23a is connected to the film feeding-out driving member, whereby feeding-out operation and rewinding operation of the film 26 are automatically effected by the control of the microcomputer COM contained in the camera body 31. That is, when the film cartridge 39 is accommodated in the camera body 31, the film feeding-out driving member is driven and the sprocket 23 is rotated, whereby a predetermined amount of the film 26 is automatically fed out of the film cartridge 39 toward the spool chamber 37 and the leading portion 26c of the film 26 is engaged by the spool 41 in the spool chamber 37. Thereafter, each time a photographing operation is performed, the film 26 is fed out of the film cartridge 39 by one frame, thus being wound around the spool 41. After the photographing is completed, the film 26 in the spool chamber 37 is automatically rewound around the film rewinding shaft 22 contained in the film cartridge 39 by driving of the film rewinding driving member.

Figure 4:
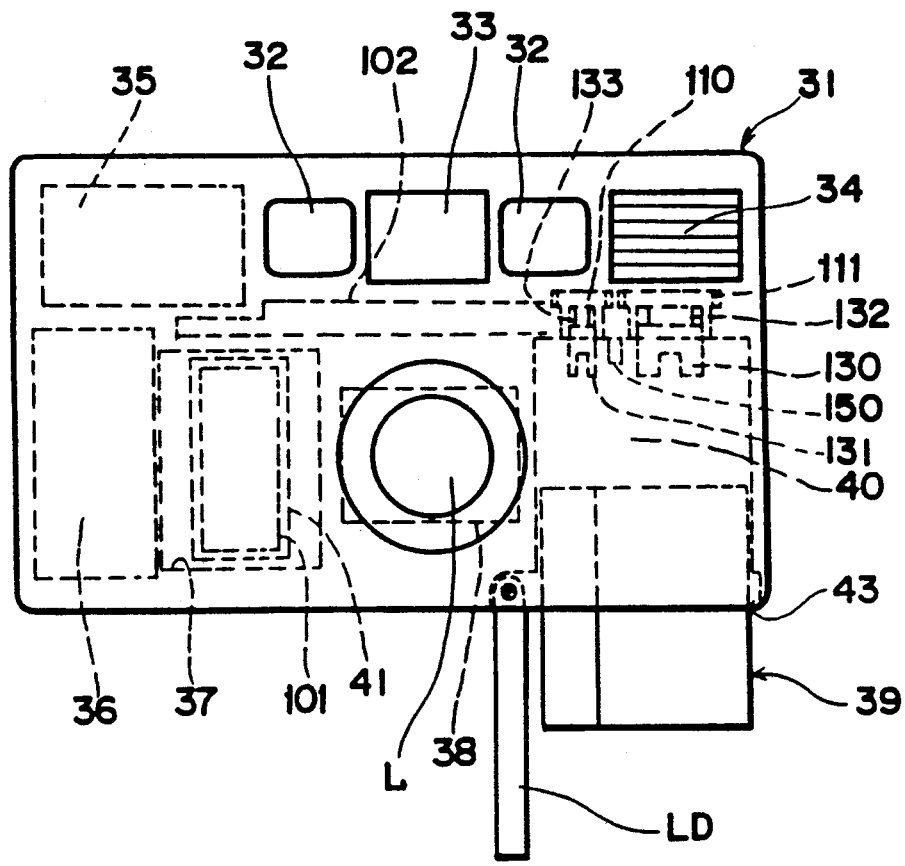
FIGS. 4 and 5 are front view and bottom view, respectively showing the condition in which the abovedescribed film cartridge is being accommodated in the film cartridge accommodating chamber of the camera body.
Figure 6:
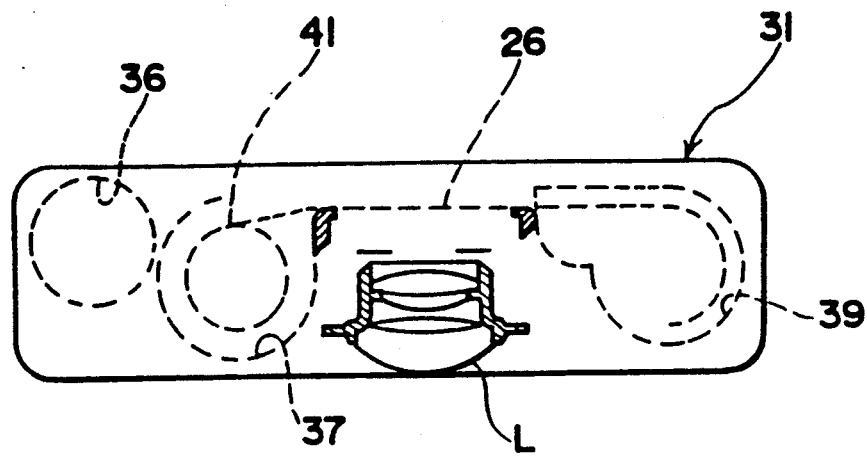
FIG. 6 is a plan view of the camera showing the condition in which the above-described film cartridge has been accommodated in the film cartridge accommodating chamber of the camera body shown in FIG. 4.
Figure 5:
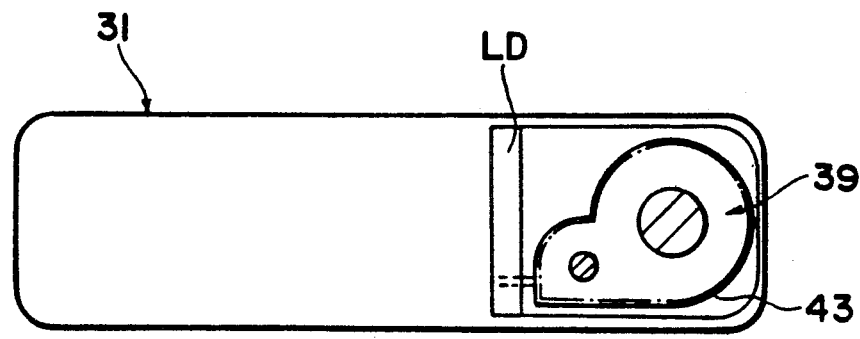

FIGS. 4 and 5 show more concretely the camera shown in FIG. 3. As shown in FIGS. 4 and 5, a cover LD formed on the bottom surface of the film cartridge accommodating chamber 40 of the camera body 31 is opened and the film cartridge 39 in accordance with the embodiment is being accommodated in the cartridge accommodating chamber 40 from a film cartridge exit/entrance 43 provided on the bottom surface of the camera body 31. FIG. 6 shows the condition in which the film cartridge 39 is accommodated in the film cartridge accommodating chamber 40. The cartridge accommodating chamber 40 is provided with the upper portion thereof having a first fork 130 serving as the film rewinding driving member of the camera body 31 and a second fork 131 serving as the film feeding-out driving member of the camera body 31, each projecting downward. The first fork 130 is engaged by the first engaging portion 22a of the film cartridge 39 and the second fork 131 is engaged by the second engaging portion 23a of the film cartridge 39. The reference letter (L) in FIGS. 4 and 6 denotes a lens.

Figure 7A:
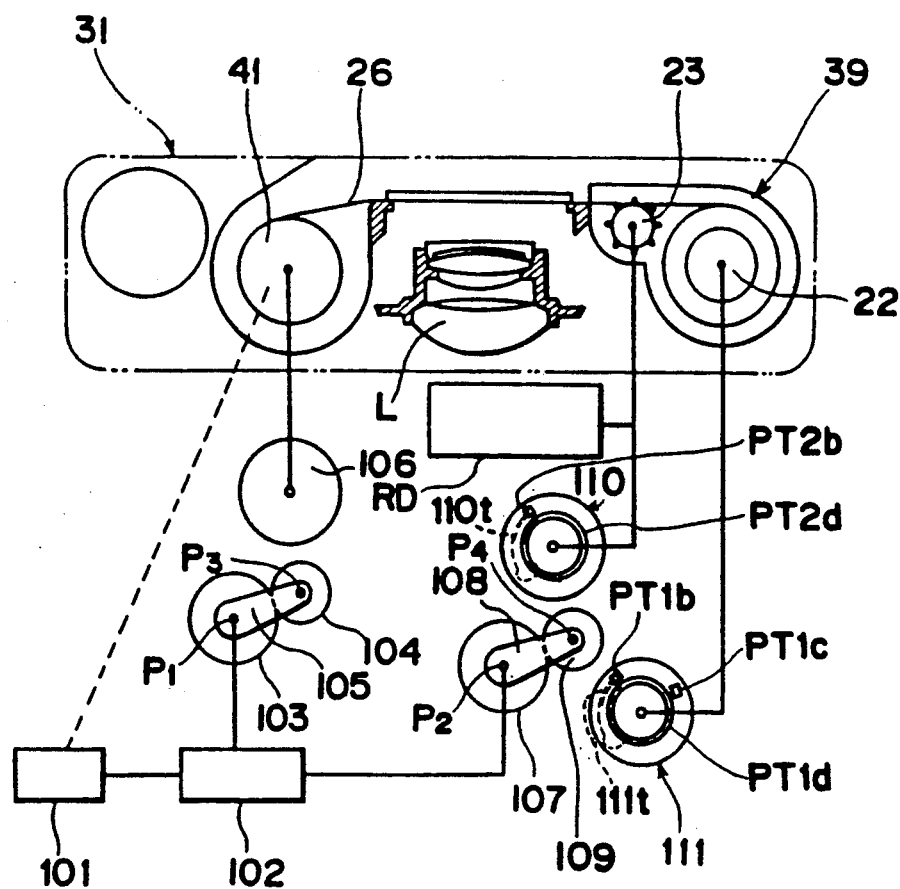
FIG. 7 (a) is an illustration of the driving units of the film rewinding shaft, the sprocket, and the spool of the camera shown in FIG. 4.
Figure 7B:
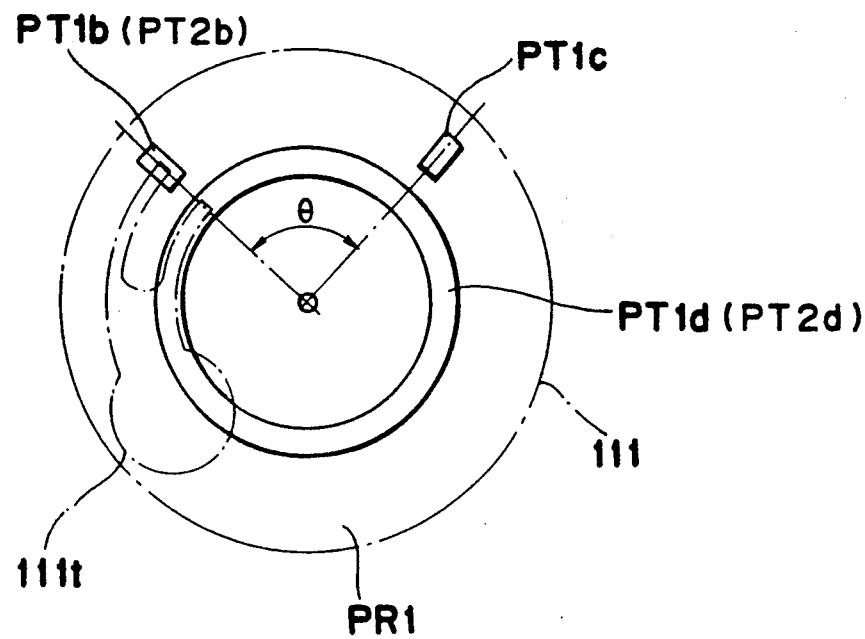
Figure 7C:
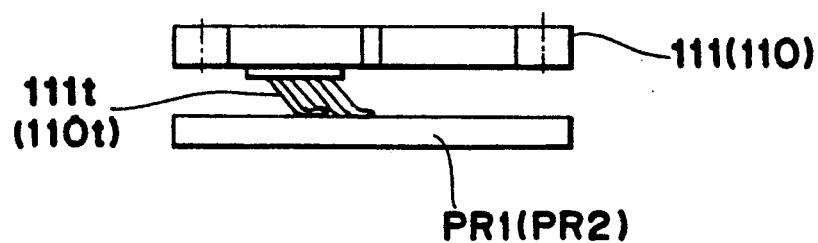

FIG. 7 (a) shows a rewinding driving mechanism for driving the first fork 130 and a feeding-out driving mechanism for driving the second fork 131. As shown in FIGS. 4 and 7 (a), the spool 41 contains a motor 101 operated when the film 26 is fed out, wound, and rewound. The motor 101 rotates gears 103 and 107 arranged to the camera body 31 through a reduction gear train 102.

The gear 103 is provided with a carrier plate 105. One end portion of the carrier plate 105 is rotatably mounted on the axis $P_1$ of the gear 103 and the other end portion thereof is rotatably mounted on the axis $P_3$ of a planetary gear 104. The gear 103 and the planetary gear 104 engage with each other. The planetary gear 104 is disposed adjacent to a gear 106 which rotates the spool 41. Accordingly, with the counterclockwise rotation of the gear 103, both the carrier plate 105 and the planetary gear 104 rotate counterclockwise about the axis $P_1$ in FIG. 7 (a), whereby the planetary gear 104 engages with the gear 106. On the other hand, when the gear 103 rotates clockwise in FIG. 7 (a), the carrier plate 105 and the planetary gear 104 rotate clockwise about the axis $P_1$, whereby the planetary gear 104 disengages from the gear 106.

The gear 107 is provided with a carrier plate 108. One end portion of the carrier plate 108 is rotatably mounted on the axis $P_2$ of the gear 107 and the other end portion thereof is rotatably mounted on the axis $P_4$ of a planetary gear 109. The gear 107 engages with the planetary gear 109. The planetary gear 109 is disposed adjacent to a gear 110 which rotates the sprocket 23 and a gear 111 which rotates the film rewinding shaft 22. Accordingly, when the gear 107 rotates counterclockwise in FIG. 7 (a), the carrier plate 108 and the planetary gear 109 rotate counterclockwise about the axis $P_2$ in FIG. 7 (a), whereby the planetary gear 109 engages with the gear 110. On the other hand, when the gear 107 rotates clockwise in FIG. 7 (a), the carrier plate 108 and the planetary gear 109 rotate clockwise about the axis $P_2$ in FIG. 7 (a), whereby the planetary gear 109 engages with the gear 111.

There is provided between the gear 110 and the sprocket 23 a sprocket-rotational amount detecting circuit RD which generates a predetermined number of pulses according to the predetermined rotational amount of the sprocket 23.

The first fork 130 and the gear 111 are connected to each other so as to be rotated in association therewith. A coil spring 132 (see FIG. 4) is mounted between the first fork 130 and the gear 111, whereby the first fork 130 is moved toward the gear 111. Accordingly, when the film cartridge 39 is accommodated in the cartridge accommodating chamber 40 of the camera body 31, the first fork 130 immediately engages with the first engaging portion 22a if the first fork 130 is located at a rotational position at which it engages with the first engaging portions 22a of the film cartridge 39 and do not engage with each other if the rotational positions of both do not coincide with each other and the first fork 130 is moved away against the urging force of the coil spring 132. In this case, when the rotational positions of both coincide with each other as a result of the relative rotations of both, the first fork 130 is moved toward the first engaging portion 22a of the film cartridge 39 by the urging force of the coil spring 132, whereby both engage with each other.

The second fork 131 and the gear 110 are connected to each other so as to be rotated in association therewith. A coil spring 133 (see FIG. 4) is mounted between the second fork 131 and the gear 110, whereby the second fork 131 is moved toward the gear 110. Accordingly, when the film cartridge 39 is accommodated in the cartridge accommodating chamber 40 of the camera body 31, the second fork 131 engages with the second engaging portion 23a of the film cartridge 39 if the second fork 131 is located at a rotational position at which the second fork 131 is capable of engaging with the second engaging portion 23a of the film cartridge 39. If the rotational positions of both do not coincide with each other, both are incapable of engaging with each other, so that the second fork 131 is moved away against the urging force of the coil spring 133. Thereafter, when the rotational positions of both coincide with each other as a result of the relative rotations of both, the second fork 131 is moved toward the second engaging portion 23a of the film cartridge 39 by the urging force of the coil spring 133, whereby both engage with each other.

FIG. 7 (b) and 7 (c) are enlarged views showing the gears 111 and 110. Substrates PR1 and PR2 are provided to confront the gears 111 and 110, respectively, and common patterns PT1d and PT2d which are grounded and formed to be annular are provided on the substrates PR1 and PR2, respectively. A pattern PT1b composing a switch $S_3$ and a pattern PT1c composing a switch $S_5$ are formed on the substrate PR1, and a pattern PT2b composing a switch $S_4$ is formed on the substrate PR2. These patterns PT1b, PT1c, and PT2b are connected to input terminals $IP_3$, $IP_5$, and $IP_4$, respectively of the microcomputer COM.

Contacts 111t and 110t are provided on the gears 111 and 110, respectively so that the contacts 111t and 110t confront the above-described patterns, whereby the phases (rotational positions) of the gears 111 and 110, namely, the phases of the first and second forks 130 and 131 are specified. That is, when the contacts 111t and 110t slide and reach specific positions, the contact 111t connects the pattern PT1d to the pattern PT1b or the pattern PT1c and the contact 110t connects the pattern PT2d to the pattern PT2b, whereby the switch $S_3$ or $S_4$ and the switch S are actuated. As a result, the potential of the input terminal of the microcomputer COM changes from "high" to "low". At this time, the motor 101 is braked to stop the gears 111 and 110 so that the phases of the gears 111 and 110, namely, the phases of the first and second forks 130 and 131 are specified. That is, according to this, the phase of the first fork 130 and that of the first engaging portion 22a of the rewinding shaft 22 are predetermined so that both are capable of engaging with each other and the phase of the second fork 131 and that of the second engaging portion 23a of the sprocket 23 are predetermined so that both are capable of engaging with each other. Thus, the film cartridge 39 can be easily accommodated in the cartridge accommodating chamber 40. The operation for adjusting the phases of the gears 111 and 110 is selectively carried out when the gears 111 and 110 are selectively connected to the motor 101 through the gears 107 and 109.

Figure 8:
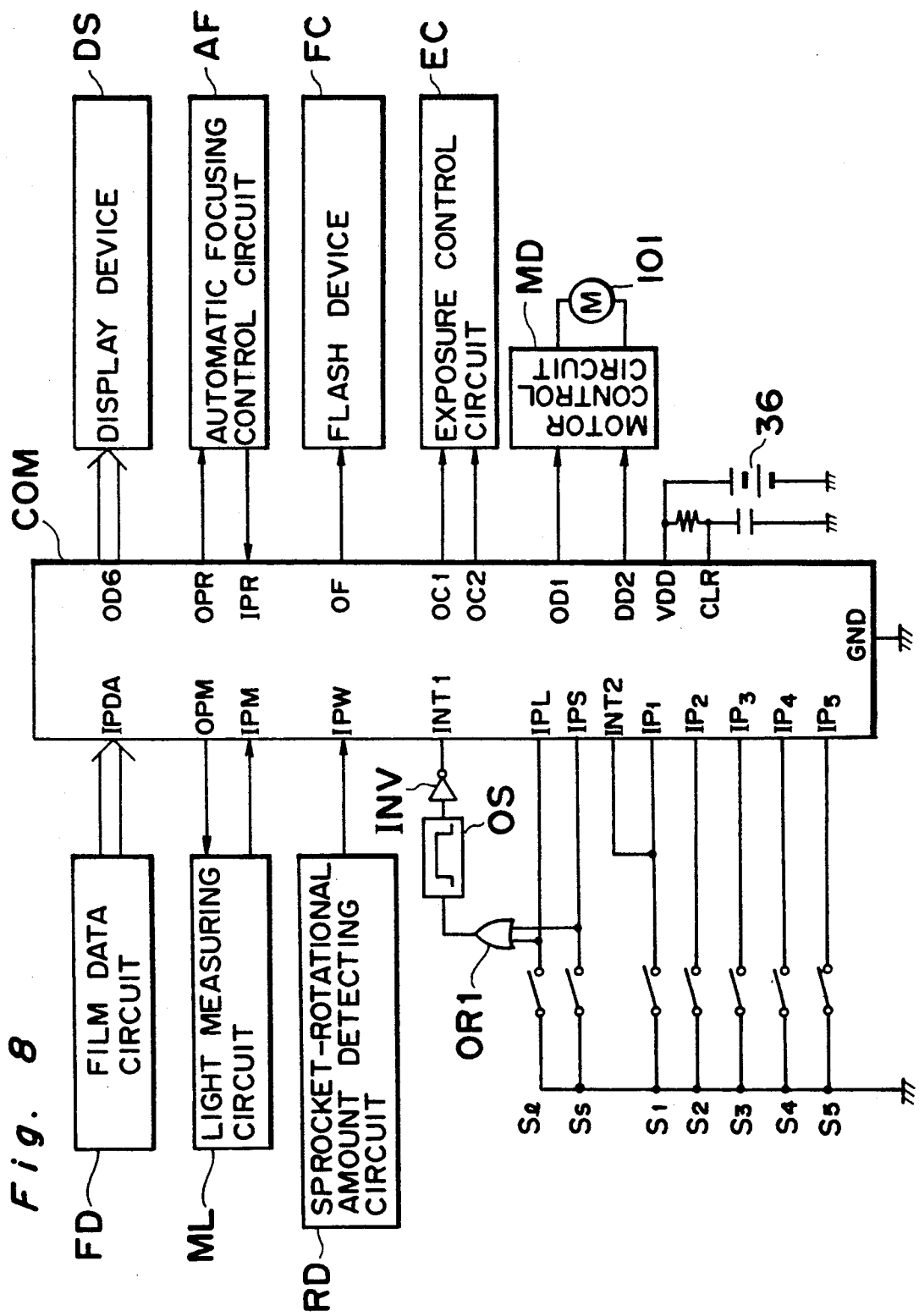
FIG. 8 is a circuit diagram of the microcomputer COM of the camera shown in FIG. 4.

The operation of the camera employing the film cartridge 39 in accordance with the embodiment is controlled by the microcomputer COM shown in FIG. 8. The following circuits and devices are connected to the microcomputer COM: that is, a film data circuit FD for reading the film data recorded on the peripheral face of the film cartridge 39, the sprocket-rotational amount detecting circuit RD for detecting the rotational amount of the sprocket 23 and outputting a signal according to the number of rotations, a light measuring circuit ML for measuring the luminance of an object, an automatic focusing control circuit AF for measuring the distance between the object and the camera and driving the lens (L) for focusing, a display device DS for displaying various conditions of the camera, an electronic flash device FC including a xenon flash tube for emitting a flashlight, an exposure controlling device EC for driving a diaphragm and a shutter when a photograph is taken, a motor controlling circuit MD for controlling the motor 101 provided in the spool 41, a power source 36, a cartridge detecting switch $S\mu$ which is closed when the film cartridge 39 is accommodated in the cartridge accommodating chamber 40, a cover detecting switch Ss which is closed when the cover LD of the cartridge accommodating chamber 40 is closed, a switch $S_1$ which is closed when a two-stage pressing type shutter release button is pressed to a first stage, and a switch $S_2$ which is closed when the shutter release button is pressed to a second stage. The switch Ss may be constructed to be closed when the cover LD having a locking mechanism is locked.

An initializing operation, an initial film winding operation, a photographing operation, a film winding operation, and a film rewinding operation of the camera to be controlled by the microcomputer COM are described hereinafter.

(Initializing operation)

Figure 9:
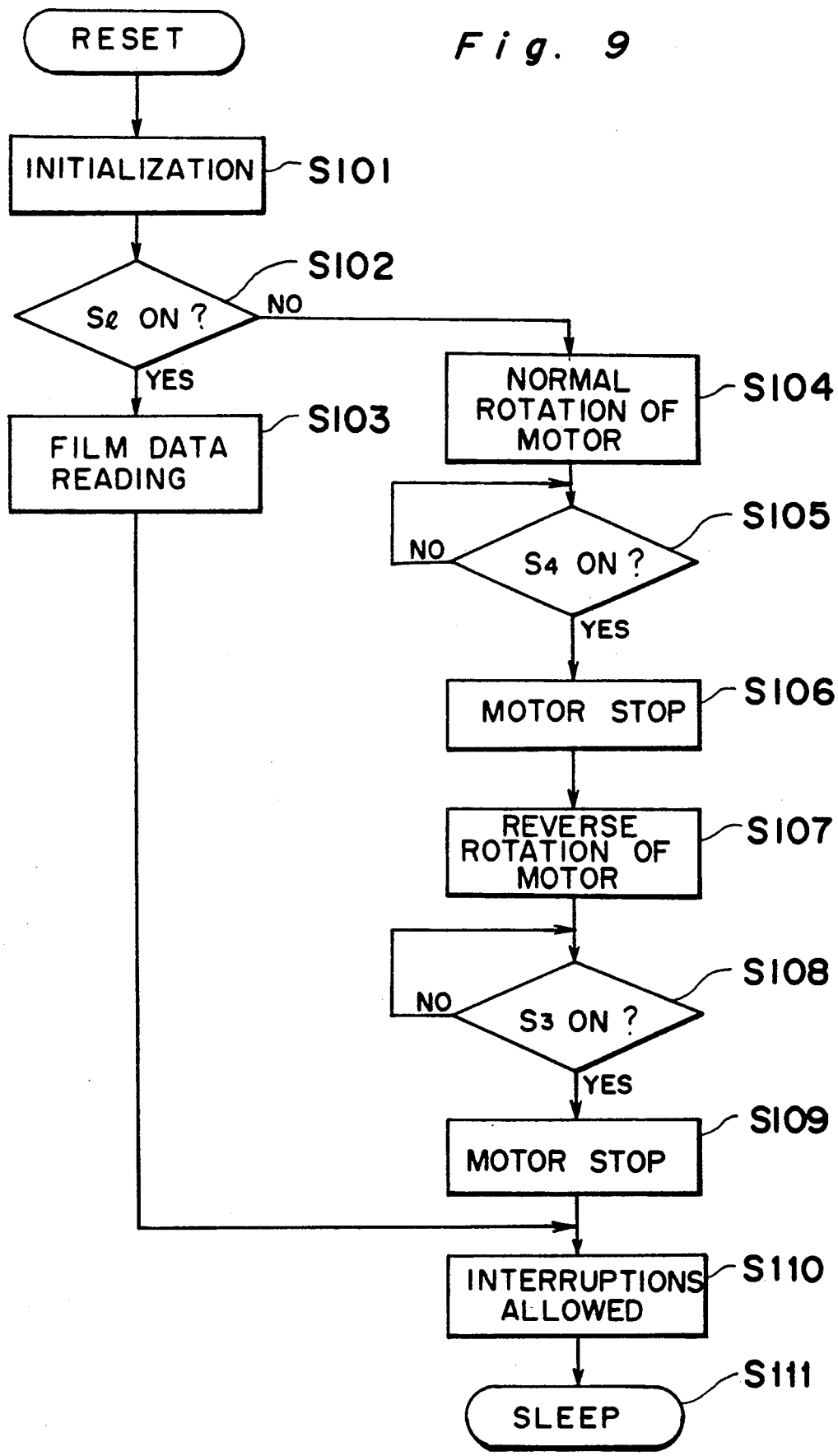
FIG. 9 is a flowchart showing the initializing operation of the camera shown in FIG. 4.

When the power source 36 is turned on, that is, a power switch (not shown) is turned on or batteries of the camera are exchanged, the initializing operation is performed as shown in FIG. 9. That is, upon the turning-on of the power source 36, input and output terminals and a storing circuit are initialized at step S101. Next, at step S102, it is detected whether or not the switch $S\mu$ is closed, that is, the film cartridge 39 is accommodated in the film cartridge chamber 40. If the switch $S\mu$ has been closed, the film cartridge 39 is accommodated therein and at step S103, the information such as the film sensitivity and the number of photographable frames is read by the film data circuit FD from the film data 21d on the film cartridge. At this time, the number of the photographable frames is stored correspondingly with the number of the perforations 26a formed on the film 26. Next at step S110, other interruption operations are allowed. Thereafter, at step S111, the initializing operation is terminated and a final frame flag which is described later is initialized.

If a decision is made at step S102 that the switch $S\mu$ is not closed, i.e., if the film cartridge 39 has not been accommodated in the film cartridge chamber 40, at steps S104 and S105, the motor 101 is kept rotated in a normal direction until the switch $S_4$ is closed. If a decision is made at step S105 that the switch $S_4$ is closed, the motor 101 is stopped (step S106) so as to stop the second fork 131 at the initial rotational position. Thereafter, at steps S107 and S108, the motor 101 is reversed until the switch $S_3$ is closed. If the switch $S_3$ has been closed, the motor 101 is stopped at step S109 so as to stop the first fork 130 at the initial rotational position. Thereafter, at step S110, interruptions are allowed and at step S111, the microcomputer COM is brought to a halt.

(Initial film winding operation)

Figure 10:
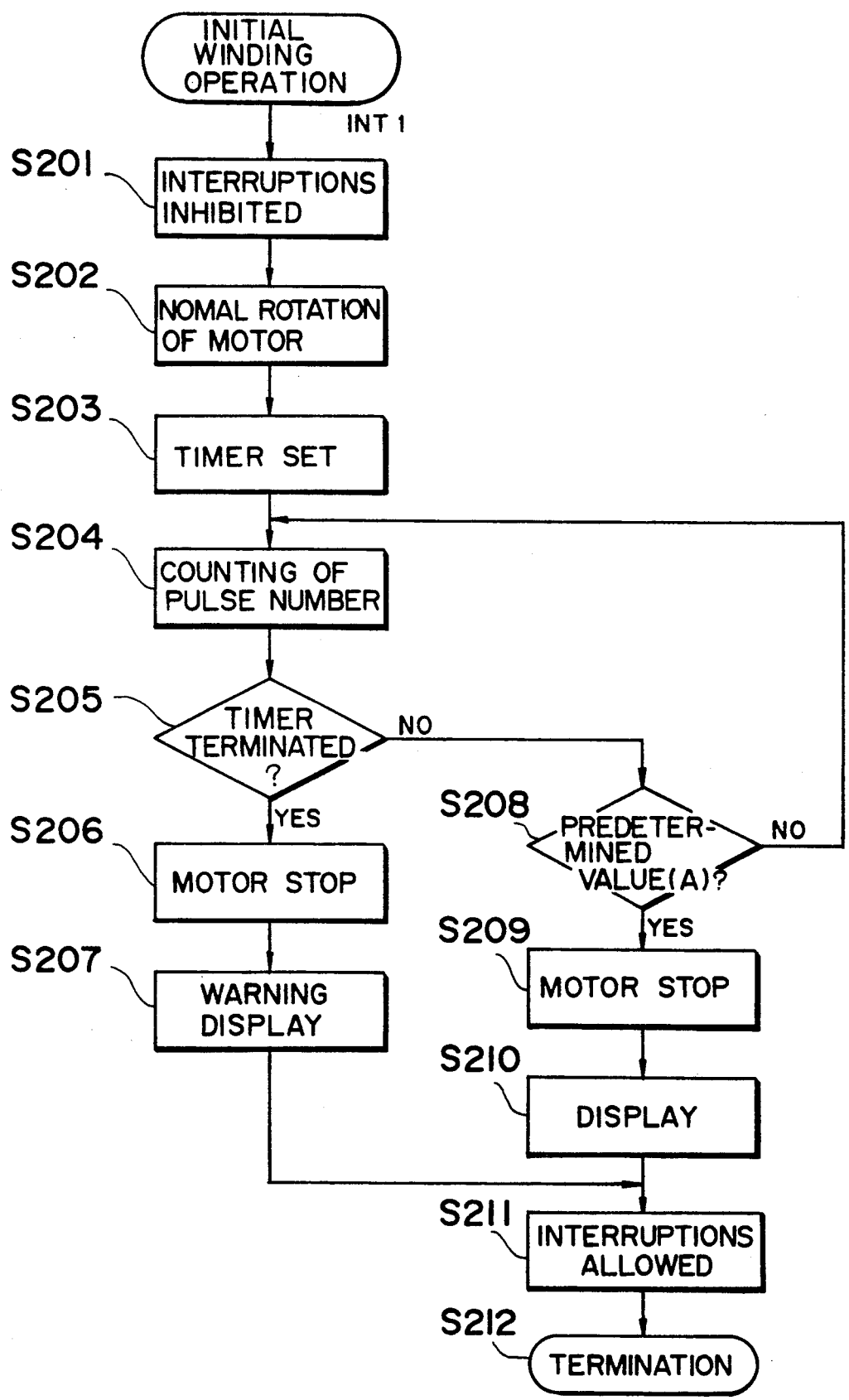
FIG. 10 is a flowchart showing the initial film winding operation of the camera shown in FIG. 4.

In response to the insertion of the film cartridge 39 into the cartridge accommodating chamber 40, the initial film winding operation as shown in FIG. 10 is performed.

That is, when the film cartridge 39 is accommodated in the cartridge accommodating chamber 40 and the cover LD of the cartridge accommodating chamber 40 is closed, both the above-described cartridge detecting switch $S\mu$ and the cover detecting switch Ss are closed. As a result, as shown in FIG. 8, an OR circuit OR1 connected to the switches $S\mu$ and Ss outputs a low signal. Consequently, a pulse generating circuit OS connected to the OR circuit OR1 outputs a high signal during a specified period. As a result, a low signal is inputted from an inverter INV connected to the circuit OS to the interruption terminal INT1 of the microcomputer COM, whereby the interruption INT1 is allowed and the other interruption operations are inhibited at step S201 as shown in FIG. 10. Next, at step S202, the normal rotation of the motor 101 is started, then the program goes to step S203 at which a timer is set.

When the motor 101 is rotated in the normal direction at step S202, the rotation is transmitted to the gear 103 through the reduction gear train 102. As a result, the gear 103 rotates counterclockwise about the axis $P_1$ in FIG. 7(a). Consequently, the carrier plate 105 rotates counterclockwise about the axis $P_1$ of the gear 103 in FIG. 7(a), and the planetary gear 104 engages with the gear 106 disposed upward and adjacent thereto. The planetary gear 104 rotates in a clockwise direction and accordingly, the gear 106 rotates counterclockwise in FIG. 7(a) and its rotation is transmitted to the spool 41. Thus, the spool 41 rotates counterclockwise in FIG. 7(a).

Similarly, the rotation of the motor 101 is transmitted to the gear 107 through the reduction gear train 102, and the gear 107 rotates counterclockwise about the axis $P_2$ thereof in FIG. 7(a). As a result, the carrier plate 108 rotates counterclockwise about the axis $P_2$ of the gear 107, with the result that the planetary gear 109 engages with the gear 110 disposed upward and adjacent thereto. The planetary gear 109 rotates in a clockwise direction and accordingly, the gear 110 rotates counterclockwise in FIG. 7(a), and the rotation thereof is transmitted to the sprocket 23. Thus, the sprocket 23 rotates counterclockwise in FIG. 7(a). As a result, since the perforations 26a formed on the leading portion of the film 26 not used are in engagement with the engaging claws of the sprocket 23, the film 26 is fed out the exit/entrance 25 as shown in FIG. 3. Thereafter, the leading portion of the film 26 is fed out along a film rail appropriately formed on the camera body 31. When the leading portion of the film 26 reaches the spool chamber 37, the perforation 26a of the film 26 engages with the engaging claw (not shown) formed on the upper peripheral face of the spool 41, which is rotating, in FIG. 3. As a result, the leading portion of the film 26 is wound around the spool 41. It is possible to provide the spool chamber 37 with a mechanism for pressing the leading portion of the film 26 against the spool 41 as necessary.

On the other hand, when the sprocket 23 starts rotating by the rotation of the motor 101 the sprocket-rotational amount detecting circuit RD outputs pulse signals corresponding to the rotational amount of the sprocket 23. At step S204, the microcomputer COM counts the pulse number of the signals.

Next, at step S205, it is detected whether or not the timer set at step S203 terminates a counting. If a decision is made that the timer is not terminated the counting, it is detected at step S208 whether or not the pulse number of the signals counted at step S204 reaches a predetermined value (A).

If a decision is made at step S208 that the pulse number of the signals reaches the predetermined value (A), that is, if a decision is made that a predetermined amount of the film 26 is fed out of the exit/entrance 25 of the case 21, the motor 101 is stopped at step S209. Thereafter, at step S210, the display device DS displays that the film cartridge 39 is normally accommodated in the film cartridge chamber 40 and the film 26 is normally wound around the spool 41, i.e., the initial film winding operation is accomplished. Next, at step S211, interruptions of other operations are allowed. At step S212, the initial film winding operation is completed.

If a decision is made at step S208 that the pulse number of the signals is smaller than the predetermined value (A), the program returns to step S204.

If a decision is made at step S205 that the counting of the timer is terminated, i.e., if a decision is made that the predetermined amount of the film 26 is not fed out of the film case 21 as a result of the occurrence of an abnormality, at step S206, the motor 101 is stopped. At step S207, the display device DS displays the occurrence of the abnormality. Then, the program goes to step S211.

(Photographing, film winding, and film rewinding operations)

Figure 11A:
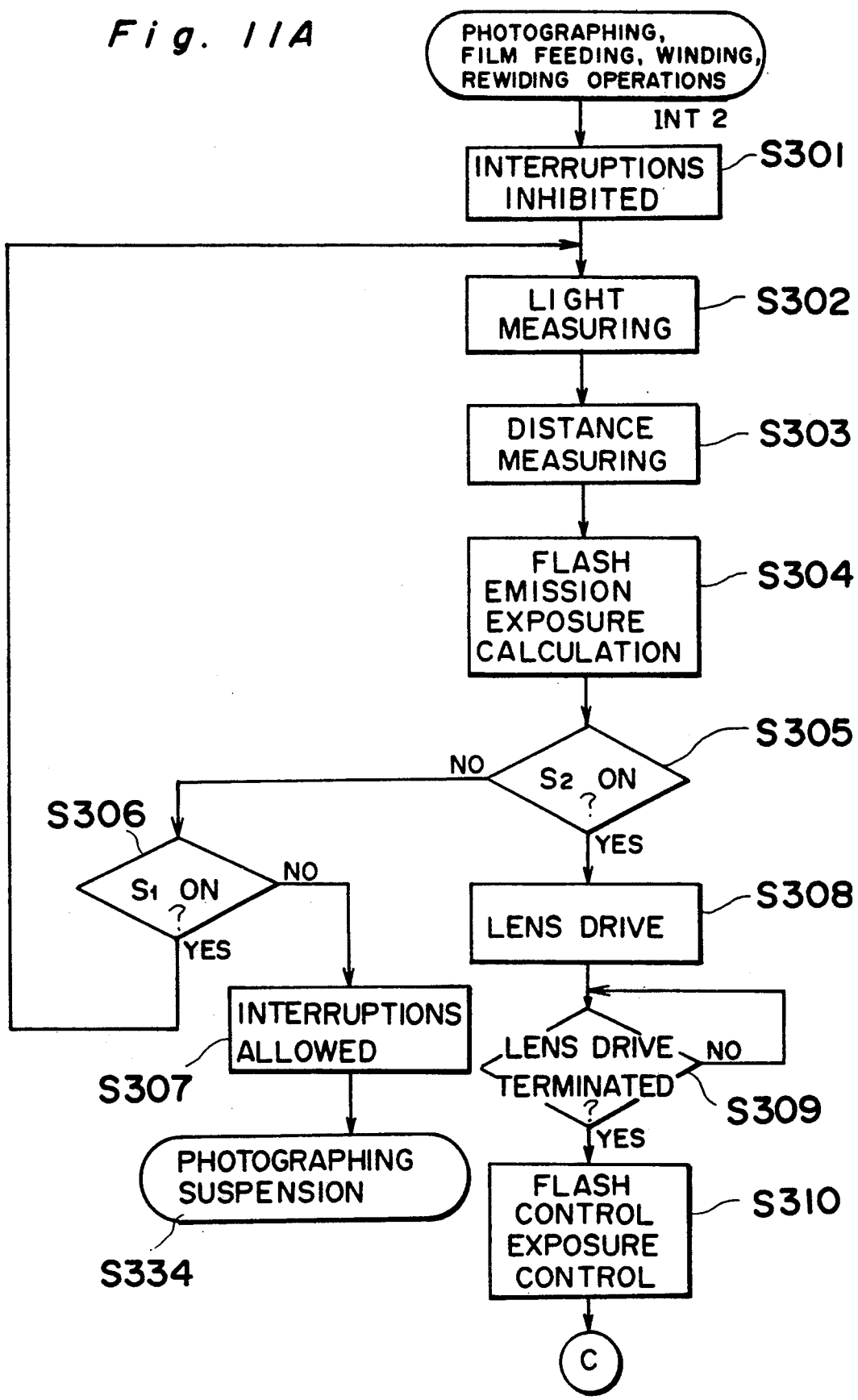
FIGS. 11A and 11B are flowcharts showing the photographing operation, film winding operation, and film rewinding operation of the camera shown in FIG. 4.
Figure 11B:
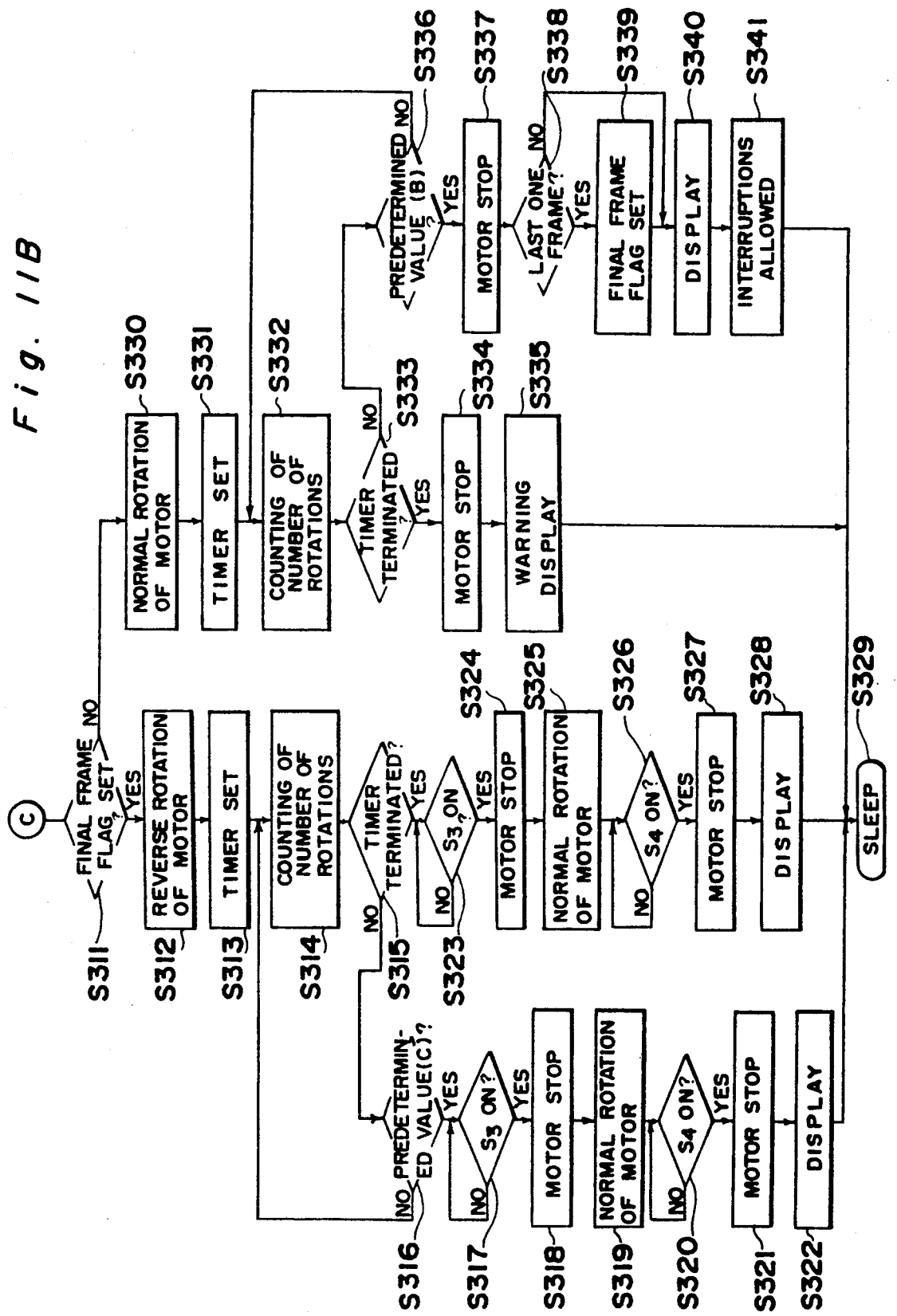

The photographing, film winding, and film rewinding operations are performed as shown in FIGS. 11A and 11B. When the switch $S_1$ is closed by the press-down of the shutter release button to the first stage, an interruption signal is inputted to an interruption terminal INT2 as shown in FIG. 8. As a result, the interruption INT2 is allowed. At step S301, interruptions of the other operations are inhibited. At step S302, the luminance of the object is measured and then at step S303, the distance between the object and the camera is measured. Next, at step S304, a decision as to whether or not a light is emitted by the electronic flash 34 is made and the calculation of an exposure controlling value is performed based on the measured result obtained at steps S302 and S303 and the film sensitivity obtained in the above-described initializing operation.

Next, it is detected at step S305 whether or not the switch $S_2$ is closed, i.e., it is detected whether or not the shutter release button is pressed down to the second stage. If a decision is made that the shutter release button is not pressed to the second stage, at step S306, it is detected whether or not the switch $S_1$ remains closed, that is, it is detected whether or not the shutter release button is pressed to the first stage and remains there.

If a decision is made at step S306 that the shutter release button remains at the first stage, the program returns to step S302. That is, in this case, it is decided that a photographing operation is being prepared. Therefore, the operations from step S302 to step S305 and S306 are repeated until it is decided that the shutter release button is pressed to the second stage.

If a decision is made at step S306 that the shutter release button is not pressed to the first stage, it is decided that the operation is suspended. Then, at step S307, interruptions of the other operations are permitted. Thereafter, at step S334, the photographing operation is suspended.

If a decision is made at step S305 that the shutter release button is pressed to the second stage, at step S308, the lens (L) is driven to a position corresponding to the distance between the object and the camera through the automatic focusing control circuit AF. Then, at step S309, it is detected whether or not the drive of the lens (L) is completed. If a decision is made that the drive of the lens (L) is not terminated, the termination of the drive of the lens (L) is waited.

If a decision is made at step S309 that the drive of the lens (L) is completed, at step S310, an exposure operation (photographing operation) is carried out by an unshown shutter device through the exposure control device EC and a flashlight is emitted by the electronic flash 34 by the operation of the electronic flash device FC as necessary. After the exposure operation is completed, it is detected at step S311 whether or not the film 26 is the last frame according to the final frame flag.

If a decision is made at step S311 that the film 26 is not the last frame, at step S330, the motor 101 is started to rotate in the normal direction, then, the timer is set at step S331. When the motor 101 is rotated in the normal direction at step S330, as described previously, the sprocket 23 and the spool 41 rotate counterclockwise in FIG. 7(a). As a result, the film 26 is fed out of the exit/entrance 25 and wound around the spool 41. When the sprocket 23 starts rotating, the sprocket-rotational amount detecting circuit RD outputs pulses corresponding to the rotational amount of the sprocket 23. At step S332, the pulse number is counted.

Next, it is detected at step S333 whether or not the timer set at step S331 completed its counting. If a decision is made that the counting is not terminated, it is detected at step S336 whether or not the pulse number counted at step S332 reaches a predetermined value (B) corresponding to the amount to be wound for one frame of the film 26.

If a decision is made at step S336 that the pulse number is smaller than the predetermined value (B), the program returns to step S332.

If a decision is made at step S336 that the pulse number reaches the predetermined value (B), i.e., if a decision is made that the film 26 is wound by one frame around the spool 41, at step S337, the motor 101 is stopped.

Next, it is detected at step S338 whether or not the remaining frames except the frames already exposed is one, i.e., it is detected whether or not the remaining frame is the final frame according to the total number of pulses counted from the time when the film is accommodated in the cartridge accommodating chamber 40. If a decision is made that the frame is not the final frame, at step S340, the display device DS displays the completion of the winding of one frame and the number of frames exposed. Then, at step S341, interruptions of the other operations are allowed and then, at step S329, the film winding operation is terminated.

If a decision is made at step S338 that the remaining frame is the final frame, at step S339, a final frame flag is set to the condition displaying that the remaining film is the final frame. Then, the program goes to step S340.

If a decision is made at step S333 that the timer set at step S331 is completed counting, i.e., if a decision is made that one frame of the film is not wound due to the occurrence of an abnormality, at step S334, the motor 101 is stopped. Then, at step S335, a warning display is made by the display device DS. Thereafter, the film winding operation is terminated at step S329.

It is possible at step S335 to carry out a rewinding operation which is described later after the warning display is effected by the display device DS.

If a decision is made at step S311 that the final frame flag is set in the condition displaying that the frame exposed at step 310 is the final frame, that is, the photographing of the final frame of the film 26 is terminated, the motor 101 is reversed at step S312 so as to start the film rewinding operation. Then, the timer is set at step S313. When the motor 101 is reversed at step S312, the rotation thereof is transmitted to the gear 103 through the reduction gear train 102, and the gear 103 rotates clockwise about the axis $P_1$ in FIG. 7(a). Consequently, the carrier plate 105 rotates clockwise bout he axis $P_1$ of the gear 103. As a result, the planetary gear 104 disengages from the gear 106. Similarly, the rotation of the motor 101 is transmitted to the gear 107 through the reduction gear train 102, and the gear 107 rotates clockwise about the axis $P_2$ thereof in FIG. 7(a). As a result, the carrier plate 108 clockwise about the axis $P_2$ of the gear 107, with the result that the planetary gear 109 disengages from the gear 110 and engages with the gear 111 disposed downward and adjacent thereto shown in FIG. 7(a). The planetary gear 109 rotates in a counterclockwise direction and accordingly, the gear 111 rotates clockwise and the rotation thereof is transmitted to the film rewinding shaft 22 and the film rewinding shaft 22 rotates clockwise in FIG. 7(a). As a result, the film 26 is rewound around the film rewinding shaft 22. Since the engaging claw of the sprocket 23 engages with the perforation 26a of the film 26, the sprocket 23 rotates clockwise in FIG. 7 as the film 26 is rewound by the film rewinding shaft 22. As a result, the sprocket-rotational amount detecting circuit RD outputs pulses corresponding to the reverse rotational amount of the sprocket 23, and at step S314, the pulse number is counted.

Next, it is detected at step S315 whether or not the timer set at step S313 terminates the counting. If a decision is made that the counting is not terminated, at step S316, it is detected whether or not the pulse number counted at step S314 reaches a predetermined value (C) corresponding to the amount of the film 26 wound around the spool 41 according to the normal rotation of the motor 101.

If a decision is made at step S316 that the pulse number is smaller than the predetermined value (C), the program returns to step S314.

If a decision is made at step S316 that the pulse number reaches the predetermined value (C) and exceeded the predetermined value (C), that is, if a decision is made that the frames of the film 26 is all rewound into the film cartridge 39 the film 26 is disengaged from the sprocket 23 and rewound around the film rewinding shaft 22, it is detected at step S317 whether or not the switch $S_3$ is closed. If a decision is made at step S317 that the switch $S_3$ is closed, the motor 101 is stopped at step S318 when the film rewinding shaft 22 and the first fork 130 are located at the same rotational position as the initial state. If the switch $S_3$ has not been closed, the turning-on of the switch $S_3$ is waited. At step S316, the motor 101 is reversed for a predetermined period of time after the pulse number reaches the predetermined value (C), whereby the pulse number exceeds the predetermined pulse number. Thus, the film 26 and the engaging claw of the sprocket 23 is reliably disengaged from each other and even the leading portion of the film 26 is rewound around the film rewinding shaft 22.

When the motor 101 is stopped at step S318, the motor 101 is reversed (i.e. rotated in the normal direction) at steps S319 and S320 until the switch $S_4$ is turned on. If the switch $S_4$ has been turned on, the normal rotation of the motor 101 is stopped at step S321. That is, according to this operation, the sprocket 23 and the second fork 131 are located at the same positions as the predetermined initial rotational positions thereof. Next, at step S322, the completion of the rewinding of the film 26 is displayed by the display device DS. Then, at step S329, the film rewinding operation is terminated. At this time, the film 26 is returned to the initial position. The program may go from step S316 to step S317 when the counted pulse number is a few smaller than the value (C) of the pulse number (pulse number corresponding to the amount of film rewound by the rewinding shaft 22 per rotation) corresponding to the rewound film 26 at step 316.

If a decision is made at step S315 that the timer set at step S313 is terminated a counting, i.e., if a decision is made that the film 26 is not completely rewound by the film rewinding shaft 22 in the predetermined period of time due to the occurrence of an abnormality, the same operations as performed at step S317 through step S321 are carried out at step S323 through step S327. That is, the turning-on of the switch $S_3$ is waited. If the switch $S_3$ has been turned on, the motor 101 is stopped at step S324 when the film rewinding shaft 22 and the first fork 130 are located at the same predetermined rotational positions as the initial states. Thereafter, the motor 101 is reversed (i.e. rotated in a normal direction) at steps S325 and S326 until the switch $S_4$ is turned on. If the switch $S_4$ has been turned on, the normal rotation of the motor 101 is stopped at step S327 when the sprocket 23 and the second fork 131 are located at the same predetermined rotational positions as the initial states. Then, a warning display is made by the display device DS at step S328. Thereafter, the film rewinding operation is terminated at step S329.

Figure 12:
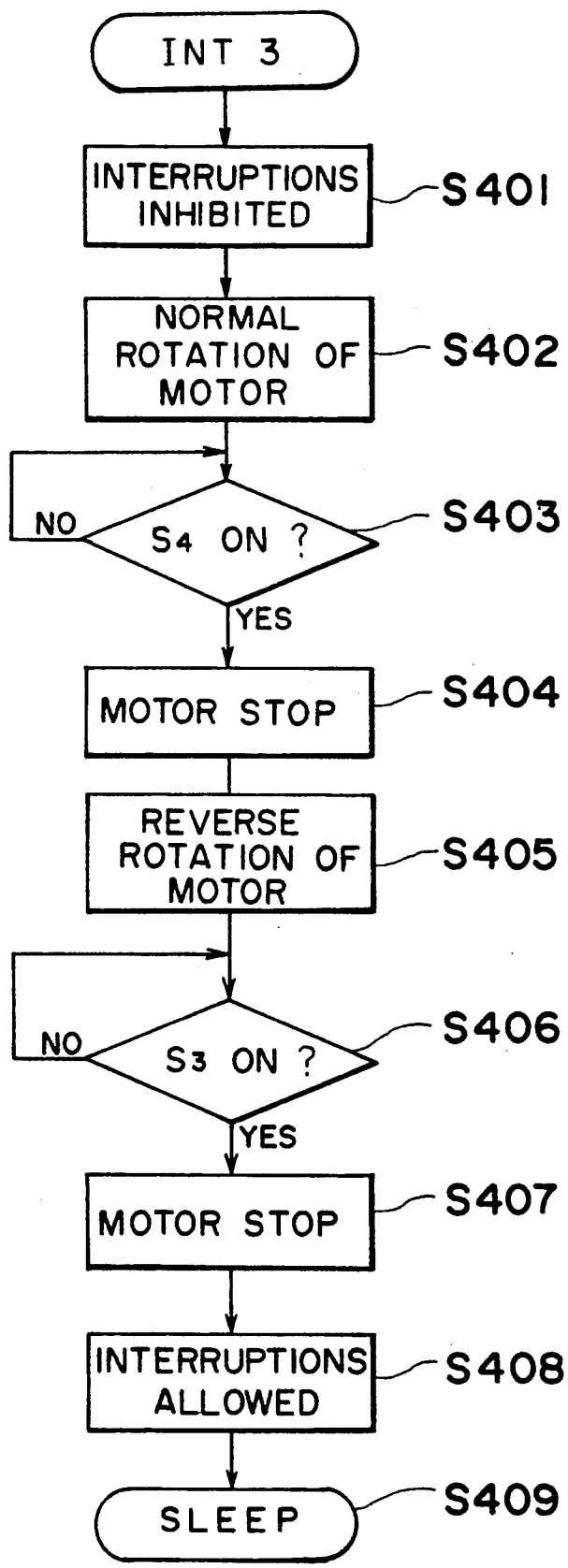
FIG. 12 is a flowchart showing the operations to be performed when the film cartridge is taken out of the film accommodating chamber or when the cover of the camera is opened without accommodating the film cartridge therein.

When the film cartridge 39 is taken out of the film cartridge accommodating chamber 40, that is, when the switch $S\mu$ is turned off or when the film cartridge 39 is not accommodated in the cartridge accommodating chamber 40 (the switch $S\mu$ is turned off) and the cover LD is opened (the switch $S_2$ is turned off), an interruption INT3 as shown in FIG. 12 is carried out. The operations to be performed at step S402 through step S407 are similar to those carried out at step S104 through step S109 shown in FIG. 9, that is, the first fork 130 and the second fork 131 are moved to the initial rotational positions.

Next, the mechanism for holding the film 26 at a predetermined position with respect to the film cartridge 39 is described hereinafter.

Figure 14:
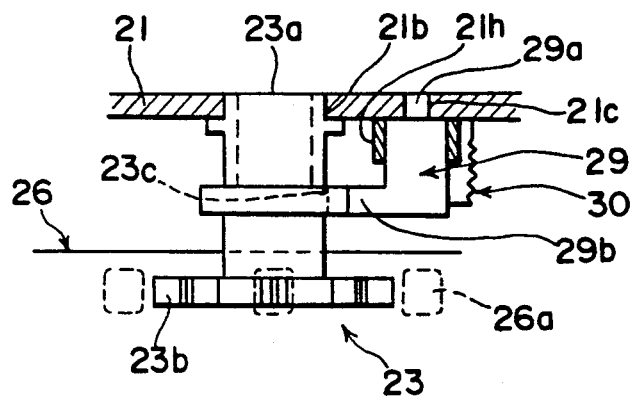
FIGS. 13 and 14 are a plan view and a sectional side view, respectively showing the locking mechanism of a sprocket provided in the film cartridge 39.
Figure 13:
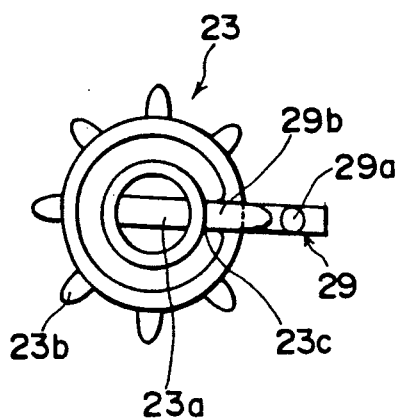

FIGS. 13 and 14 are plan and sectional views showing the locking mechanism for locking the sprocket 23 provided in the film cartridge 39, respectively. The sprocket 23 is rotatably held in the film cartridge 39, and the tooth (claw) 23b of the sprocket 23 engages with the perforation 26a of the film 26. The second engaging portion 23a disposed on the upper end portion of the sprocket 23 engages with the second fork 131 provided in the camera body 31 when the film cartridge 39 is accommodated in the cartridge accommodating chamber 40 of the camera body 31. The sprocket 23 has a notch 23c at the flange portion fixed to the middle portion of the axis thereof. The notch 23c engages with a projection 29b of a locking member 29. A small-diameter pressing portion 29a serving as a lock releasing engaging portion and formed at the upper end portion of the locking member 29 is fitted in a small opening 21c of the case 21 of the film cartridge 39 so that the pressing portion 29a can move in the axial direction of the case 21 and projects from the case 21. A guiding cylindrical portion 21h is formed in the inner peripheral surface of the case 21 having the small opening 21c formed thereon, and guides the movement of a base portion of the pressing portion 29a in the axial direction of the case 21. A spring 30 mounted between the lower end portion of the locking member 29 and the case 21 urges the locking member 29 to move upward in FIG. 14. Therefore, the base portion contacts with the inner upper peripheral face of the case 21 of the film cartridge 39. Even though the operator desires to rotate the sprocket 23 in the condition in which the base portion is in contact with the inner upper peripheral face of the case 21, the sprocket 23 does not rotate because the locking member 29 locks the sprocket 23. The above mentioned mechanism for locking the sprocket 23 is provided to prevent the leading portion of the film 26 in the film cartridge 39 from being fed out from or wound into the film cartridge 39 when the operator carelessly rotates the sprocket 23. As seen in FIG. 13, the second engaging portion 23a and the locking member 29 extend along a plane which is parallel to a longitudinal axis of the shaft of the sprocket 23.

The operation is described hereinafter. The operator accommodates the film cartridge 39 in the cartridge accommodating chamber 40 of the camera body 31. A lock releasing pin 150 mounted in the cartridge accommodating chamber 40 penetrates into the small opening 21c of the case 21 of the film cartridge 39, thus contacting with the pressing portion 29a of the locking member 29. When the film cartridge 39 is inserted deeper into the cartridge accommodating chamber 40, the pressing member 29a of the locking member 29 is pressed downward in FIG. 14. As a result, the notch 23c of the sprocket 23 and the projection 29b of the locking member 29 disengages from each other and the sprocket 23 becomes rotatable. The lock releasing pin 150 and the pressing portion 29a of the locking member 29 are disposed so that the second fork 131 and the sprocket 23 are engaged with each other prior to the disengagement between the notch 23c and the projection 29b. The sprocket 23 which has been unlocked is rotated by the rotation of the second fork and the feeding-out of the film 26 is carried out.

When the sprocket 23 is being locked by the locking member 29, the phase of the second engaging portion 23a of the sprocket 23 is set to be in a predetermined phase. When the film cartridge 39 is accommodated in the camera body 31, the second fork 131 and the second engaging portion 23a are smoothly engaged with each other by setting the phase of the second fork 131 disposed on the camera body 31 to the phase corresponding to the phase of the second engaging portion 23a. As a result, the ratio of the rotational amount of the gear 110 which rotates the sprocket 23 to the feeding-out amount of the film 26 is set to 1:1. In rewinding the film 26, the motor 101 is stopped when the same amount of the film 26 as the feeding-out amount is rewound, whereby the phase of the second fork 131 is stopped at the same condition as the phase prior to the feeding-out of the film 26.

Figure 15:
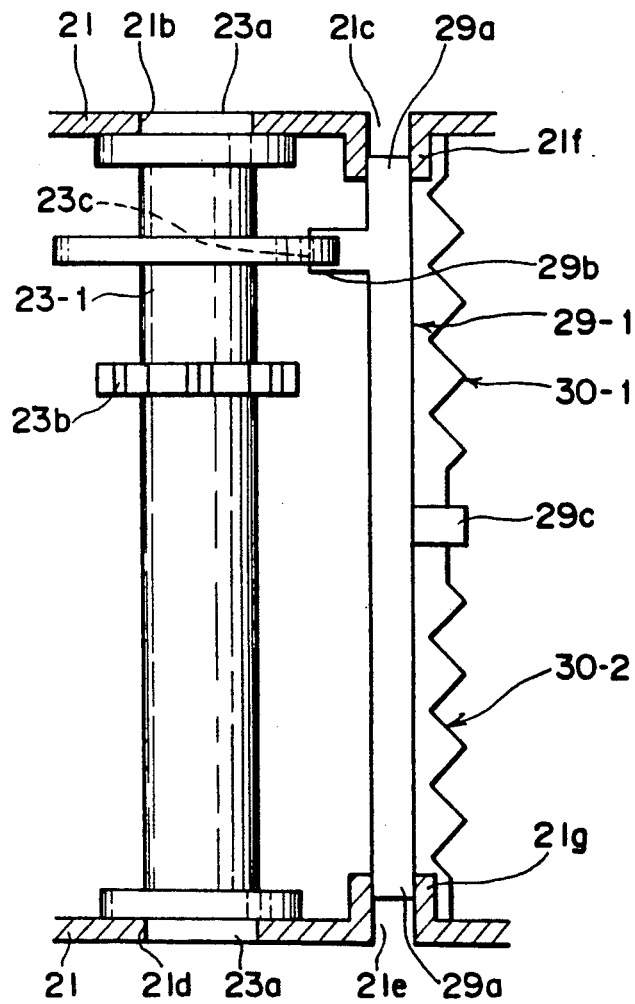
FIG. 15 is a sectional side view showing the locking mechanism of a sprocket in accordance with another embodiment.

In addition to the above-described mechanism, a mechanism as shown in FIG. 15 can be adopted. That is, in the embodiment shown in FIG. 15, the sprocket can be unlocked either from the top end portion or the lower end portion of the film cartridge. According to this mechanism, the camera can be more freely designed.

Similarly to the above description, the locking member 29-1 has the projection 29b for stopping the rotation of the sprocket 23-1. The locking member 29-1 has pressing portions 29a and 29a at the upper and lower portions thereof, which are axially movably fitted to the small holes 21c and 21e formed by openings bored in the case 21 and surrounded by guiding cylindrical portions 21f and 21g formed in the inner peripheral face of the case 21. Either of the pressing portions 29a and 29a is pressed by the lock releasing pin 150 of the camera. Two springs 30-1 and 30-2 are mounted between the inner peripheral wall of the case 21 and the locking portion 29c of the locking member 29-1. Thus, even though the locking member 29-1 is pressed either from the upper side or the lower side, the sprocket 23 can be unlocked and the locking member 29-1 can be returned to the initial state by the two springs 30-1 and 30-2. In this embodiment, the sprocket 23-1 has second engaging portions 23a and 23a at the upper and lower portions thereof, thus being exposed to the outside through the opening 21b and an opening 21d which penetrate through the case 21. According to this mechanism, the camera also can be more freely designed since the second fork 131 can be provided either at the upper side or at the lower side of the camera body 31.

The phases of the second engaging portions 23a and 23a are set to take predetermined positions in this construction as well. Similarly to the sprocket 23-1, the film rewinding shaft 22 may be locked. The phase of the first engaging portion 22a of the film rewinding shaft 22 is set to be located at a predetermined position so that the phase thereof coincides with the phase of the first fork 130 disposed on the camera body 31, whereby the film cartridge 39 can be more easily accommodated in the film cartridge accommodating chamber 40.

A mechanism different from the above-described mechanisms can be adopted. With the above-described embodiment, the sprocket is unlocked in the case where the film cartridge 39 is accommodated in the camera body 31 even though the cover LD is not closed. Therefore, if the cover LD is opened and left opened with the film cartridge 39 accommodated in the film cartridge accommodating chamber 40, it may occur that a light penetrates into the film cartridge 39 through the small holes and that the film 26 disengages from the sprocket 23 due to the curl of the film 26. The above-described problem should be considered not only in accommodating the cartridge 39 in the camera body 31, but also in taking out the cartridge 39 used from the camera body 31. Therefore, the modifications in which methods for more safely unlocking the mechanism for locking the feeding-out of the film 26 are provided will be described hereinbelow.

Figure 16:
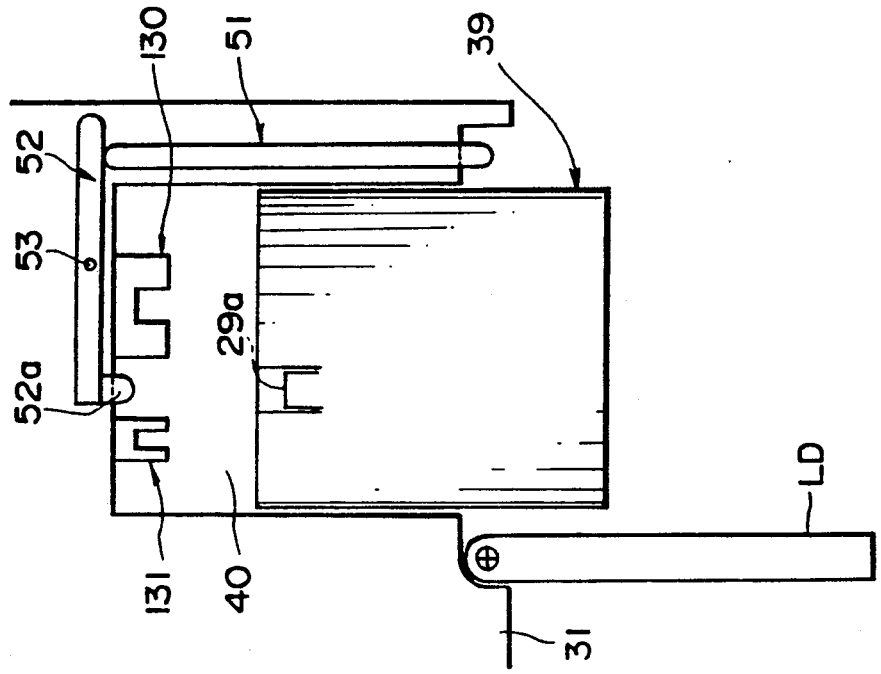
FIGS. 16 through 19 are illustrations showing modifications of a lock releasing mechanism.

FIG. 16 shows a first modification of the embodiment in which there is provided, on the inner face of the cover LD which prevents a light from entering into the cartridge accommodating chamber 40, with a lock releasing pin 50 for releasing a film feeding-out locking mechanism provided in the cartridge 39. The lock releasing pin 50 engages with the pressing portion 29a of the locking member 29 of the cartridge 39 and presses this portion 29a when the cover LD is closed, whereby the film feeding-out locking mechanism is unlocked.

According to this modification, unlike the unlocking method described in the above-described embodiment, only the accommodation of the cartridge 39 in the camera body 31 does not allow the feeding-out locking mechanism to be unlocked and the locking mechanism is unlocked immediately before the cover LD is closed. Accordingly, the occurrence of such a problem as described above can be reduced. In the first modification, the first and second forks 130 and 131 which drive the film are provided on the upper wall of the cartridge accommodating chamber 40 of the camera body 31, and the lock releasing pin 50 is provided on the cover LD disposed in opposition to the first and second forks 130 and 131. Accordingly, a disadvantage that the cartridge 39 is displaced by the urging force of the spring 30 of the locking member 29 when the cartridge 39 is accommodated in the camera body 31 can be prevented.

Figure 17:
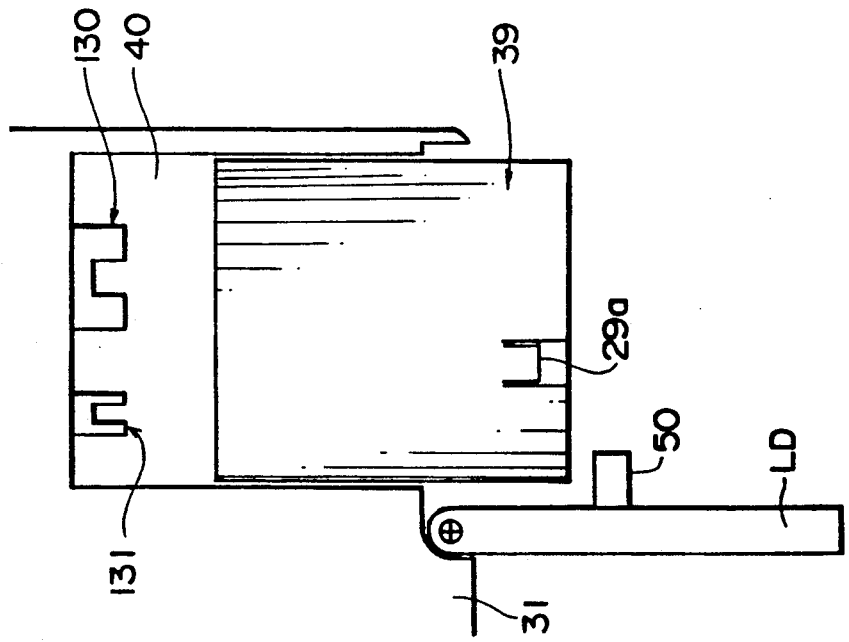

FIG. 17 shows a second modification. The cartridge accommodating chamber 40 in the camera body 31 is provided with on the upper wall thereof a swing arm 52 pivotally supported by a shaft 53 and a lock releasing pin 52a serving as a lock releasing member which is mounted on the lower end face of one end portion of the swing arm 52 and can project into the cartridge accommodating chamber 40, and the swing arm 52 is provided with on the other end thereof a push rod 51 vertically movable in the sidewall of the accommodating chamber 40 in FIG. 17. The lower end of the push rod 51 is capable of contacting with one end portion of the cover LD. Accordingly, when the cover LD is closed, the push rod 51 is moved axially by the cover LD. Thus, the push rod 51 is pivoted on the shaft 53. As a result, the lock releasing pin 52a projects into the cartridge accommodating chamber 40, thus pressing the pressing portion 29a of the locking member 29 of the cartridge 39, whereby the film feeding-out locking mechanism in the cartridge 39 is unlocked.

This modification is advantageous in that in addition to the advantage of the first modification, the cartridge 39 can be smoothly accommodated in or removed from the cartridge accommodating chamber 40 because the cover LD is not provided with pins or the like.

Figure 18:
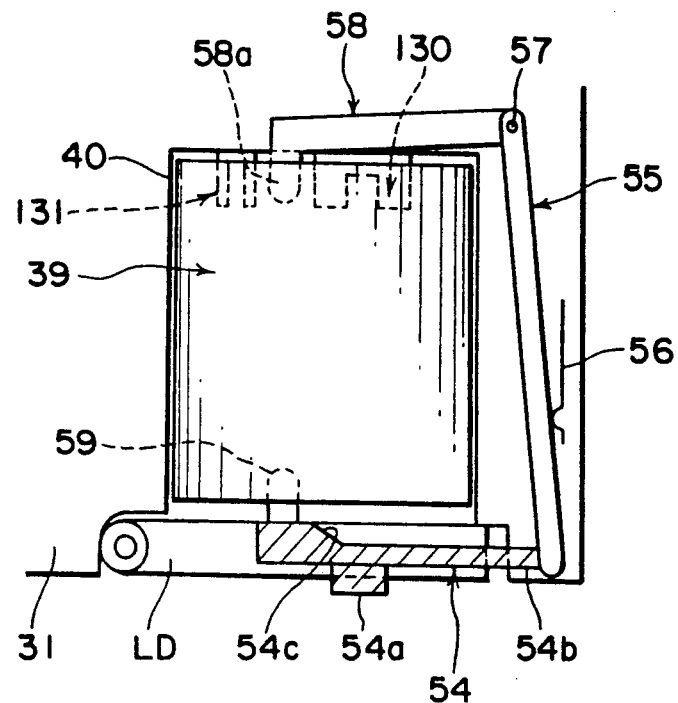

FIG. 18 shows a third modification. With this modification, two mechanisms for unlocking the film feeding-out locking mechanism are illustrated simultaneously in one drawing. However, in practice, either one of them is adopted. First, the first mechanism is described hereinbelow. The film cartridge accommodating chamber 40 in the camera body 31 is provided with on the upper wall thereof an arm 58 whose one end portion is pivotally supported by a shaft 57, and a lock releasing pin 58a serving as a lock releasing member which can penetrate into the cartridge accommodating chamber 40 is formed on the lower end face of the other end portion of the arm 58. Further, the upper end portion of a crank lever 55 arranged pivotably in the sidewall of the accommodating chamber about a shaft 57 is mounted on the other end portion of the arm 58. The lower end of the crank lever 55 is capable of contacting with one end portion of a locking member 54 slidably provided in a cover LD. The locking member 54 is provided with an operation portion 54a formed on the bottom face of the base portion thereof and projecting from the cover LD. When the locking member 54 slides toward the right in this construction, the crank lever 55 and the arm 58 pivot, thus allowing the penetration of the lock releasing pin 58a into the cartridge accommodating chamber 40. Thus, the locking mechanism can be unlocked by the pin 58a. Next, the second mechanism is described hereinbelow. The clocking member 54 is provided with upper and lower plain faces parallel with the inner face of the cover on upper face of the base portion thereof, and an inclined cam face 54c disposed between the both plain faces on the upper face of the base portion thereof. A lock releasing pin 59 serving as a lock releasing member is provided at a position above the upper face of the cam face 54c of which the upper end is capable of projecting into the accommodating chamber 40. Thus, when the cover LD is closed and the locking member 54 is slid toward the right by the operation portion 54a in FIG. 18, the lock releasing pin 59 is pushed by the cam face 54c and penetrates into the cartridge accommodating chamber 40 and presses the pressing portion 29a of the locking member 29 of the cartridge 39, whereby the film feeding-out mechanism in the cartridge 39 is unlocked.

Reference numeral 56 denotes a closing completion detecting switch Ss which is turned on when the crank lever 55 has pivoted to its pivotal range in opposition to the film cartridge 39 and is composed to start the feeding-out of the film in combination of an unshown cartridge detecting switch $S\mu$ in FIG. 18. But the switch 56 can be constructed to produce a closing completion signal in association with the movements of the lock releasing pin 58a as well as the lock releasing pin 59 by constructing the switch Ss so that it detects the movement of the locking member 54.

According to the third modification, when the closing operation of the cover LD is completed and insured by the locking member 54, the feeding-out locking mechanism is unlocked either by the lock releasing pin 59 or by the lock releasing pin 58a after the cartridge accommodating chamber 40 is completely light-intercepted. Therefore, the film 26 is never exposed by an ambient light. Further, since the switch Ss is actuated in association with the unlocking of the feeding-out locking mechanism, the lock releasing operation can be promptly succeeded by the film feeding-out operation. Therefore, such a problem does not occur due to the curly tendency of the film. Furthermore, in the third modification, while interlocking with the lock releasing operation of the locking member 54, the lock releasing pin 59 or 58a disengages from the pressing portion 29a of the locking member 29 and the locking member 29 of the cartridge 39 returns to the locking condition when the cartridge 39 is taken out of the cartridge accommodating chamber 40 after the rewinding operation of the camera is completed. Therefore, when the cover LD is opened, the film feeding-out mechanism of the cartridge 39 is in a re-locking completed condition. Therefore, the above-described problem does not occur.

Figure 19:
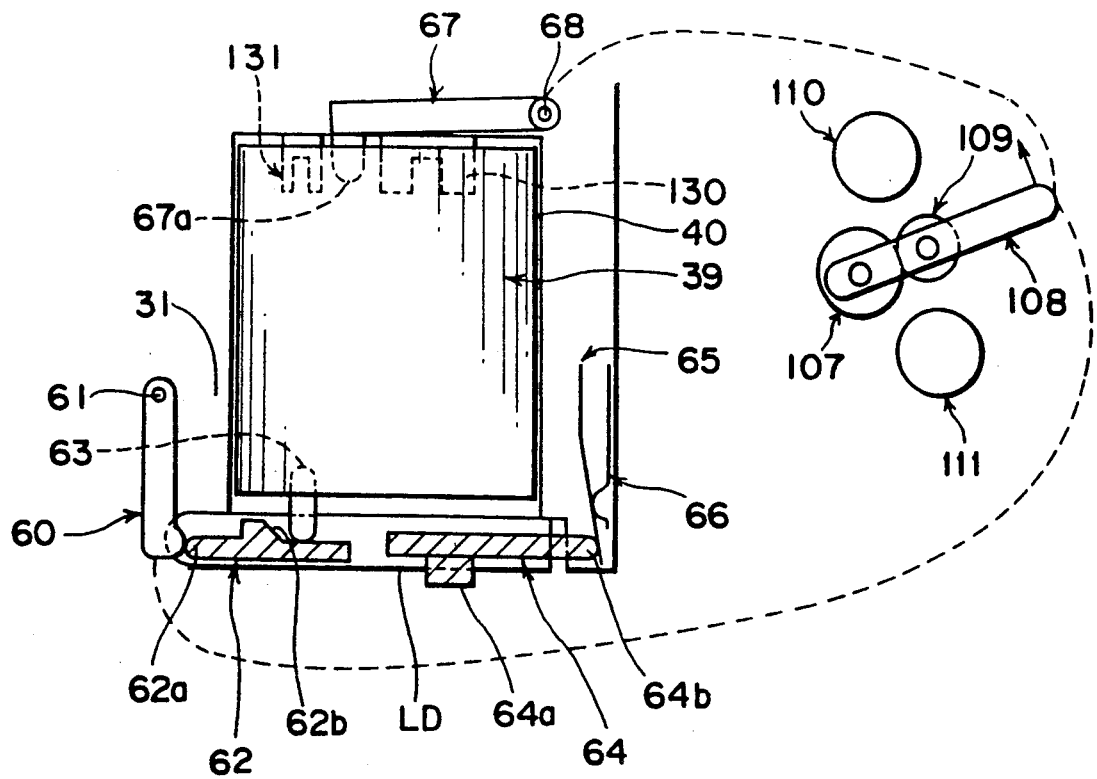

FIG. 19 also shows a fourth modification. The film cartridge accommodating chamber 40 is provided in the upper wall thereof with an arm 67 whose one end portion is pivotally supported by a shaft 68 and a lock releasing pin 67a serving as a lock releasing member capable of penetrating into the cartridge accommodating chamber 40 is provided on the other end portion of the bottom face of the arm 67. A locking member 64 is slidably provided in the cover LD. The locking member 64 has on the bottom face of the base portion thereof an operation portion 64a projecting from the cover LD.

When the locking member 64 is slid, one end thereof contacts with a movable contact 65 which in turn contacts with a fixed contact 66. The cover LD is provided on the bottom portion thereof with a slidable lever 62. The lower end portion of the lever 62 whose one end portion is pivotally supported by a shaft 61 in the sidewall of the cartridge accommodating chamber 40 is capable of contacting with one end portion of the slide lever 62. The lever 62 is provided on the upper face thereof with a cam face 62b composed of upper and lower plain faces parallel with the inner face of the cover LD and an inclined face connecting both plain faces. An lock releasing pin 63 whose upper end portion is capable of penetrating into the cartridge accommodating chamber 40 is formed on the cam face 62b and serves as a lock releasing member. In the above-described construction, when the cover LD is closed and the locking member 64 is slid by the operation portion 64a, the film feeding-out locking mechanism of the cartridge 39 is unlocked at the initial feeding-out operation performed by an unshown motor. In this case, since the detailed construction of the camera body is in conformity with the abovedescribed embodiment, the description is directed only to the portions related to the film feeding-out.

According to the fourth modification, when the cover LD is closed and the locking member 64 is slid toward the right in FIG. 19, the top end portion 64b thereof presses the contact 65 against the contact 66, whereby the cover closing completion detecting switch Ss is turned on. At this time, in cooperation with the switch Ss and an unshown cartridge detecting switch Sμ, the motor 101 (not shown in FIG. 19) is actuated to start the feeding-out of the film. As a result, the gear 107 rotates counterclockwise and the lever 108 starts rotating in the direction shown by an arrow (counterclockwise). At this time, the gear 110 connected to the second fork 131 which drives the film feeding-out mechanism does not engage with the gear 109 engaging with the gear 107. Therefore, the lever 108 rotates in the direction shown by the arrow before the film feeding-out mechanism is driven. Interlocking with the rotation of the lever 108 in the direction shown by the arrow, the lever 60 pivots counterclockwise about the shaft 61, which in turn moves the slide lever 62 toward the right in FIG. 19, with the result that the cam face 62b presses the lock releasing pin 63 upward into the cartridge 39. Thus, the film feeding-out mechanism of the cartridge 39 is unlocked. Otherwise, while interlocking with the rotation of the lever 108, the arm 67 pivots counterclockwise about the shaft 68. As a result, the lock releasing pin 67a moves downward into the cartridge 39, whereby the feeding-out mechanism in the cartridge 39 is unlocked.

The above-described construction unlocks the film feeding-out mechanism immediately before the film feedingout mechanism is driven. Accordingly, such a problem as described previously does not occur. The operation to be performed in rewinding the film is not described in FIG. 19, however, a re-lock may be carried out when the rewinding has been completed or effected when the locking member 64 is slid toward the left in FIG. 19 in order to unlock the cover LD.

According to the construction of the above-described embodiments, the sprocket 23 serving as a film feeding-out member locks the leading portion 26c of the film 26 in the vicinity of the exit/entrance of the film cartridge 39. Thus, since the film 26 can be prevented from moving with respect to the film cartridge 39, the film 26 does not undesirably come out of the film cartridge 39 beyond the predetermined amount, or the film 26 is not undesirably rewound by the film cartridge 39, whereby it never happens that the film 26 cannot be fed out of the film cartridge 39. Therefore, it is easy to handle the film cartridge 39, i.e., the film cartridge 39 can be easily accommodated in the cartridge accommodating chamber 40. That is, the leading portion 26c of the film 26 is locked in the vicinity of the exit/entrance 25 of the film cartridge 39 and the film 26 is prevented from getting out of the exit/entrance 25 in a great extent. Therefore, it is easy to handle the film cartridge 39. Further, since the sprocket 23 is provided, the amount of the film 26 which gets out of the exit/entrance of the film cartridge 39 at the initial condition can be reduced as compared with conventional film cartridge. Therefore, the film cartridge 39 can be easily handled. In addition, since the film cartridge 39 is provided with the sprocket 23 which feeds out the film 26 and it is unnecessary to get the film 26 out of the exit/entrance 25 at the initial condition, it is possible not to get the film 26 out of the exit/entrance 25.

The film 26 can be more reliably locked not only by the sprocket 23, but also by the rewinding shaft 22 by employing a locking mechanism for the rewinding shaft 22 in the same manner as that for the sprocket 23 in the above-described embodiments.

Furthermore, since the film cartridge 39 is provided with the sprocket 23 which feeds out the film 26 to the spool chamber 37, only the operation required for the operator to do is to accommodate the film cartridge 39 in the camera body 31. In feeding out the film 26 from the cartridge 39, the sprocket 23 is driven by the feeding-out driving mechanism for feeding out the film 26, and the film 26 is automatically fed out from the cartridge 39 to the spool chamber 37. Thus, the film 26 is engaged by the spool 41. Consequently, the operator only accommodates the cartridge 39 in the camera body 31, and it is unnecessary for the operator to adjust the length of the film 26 by pulling the film 26 out of the cartridge 39 or connect the film 26 with the spool 41. Thus, it is very easy to accommodate the cartridge 39 in the camera body 31.

Figure 20:
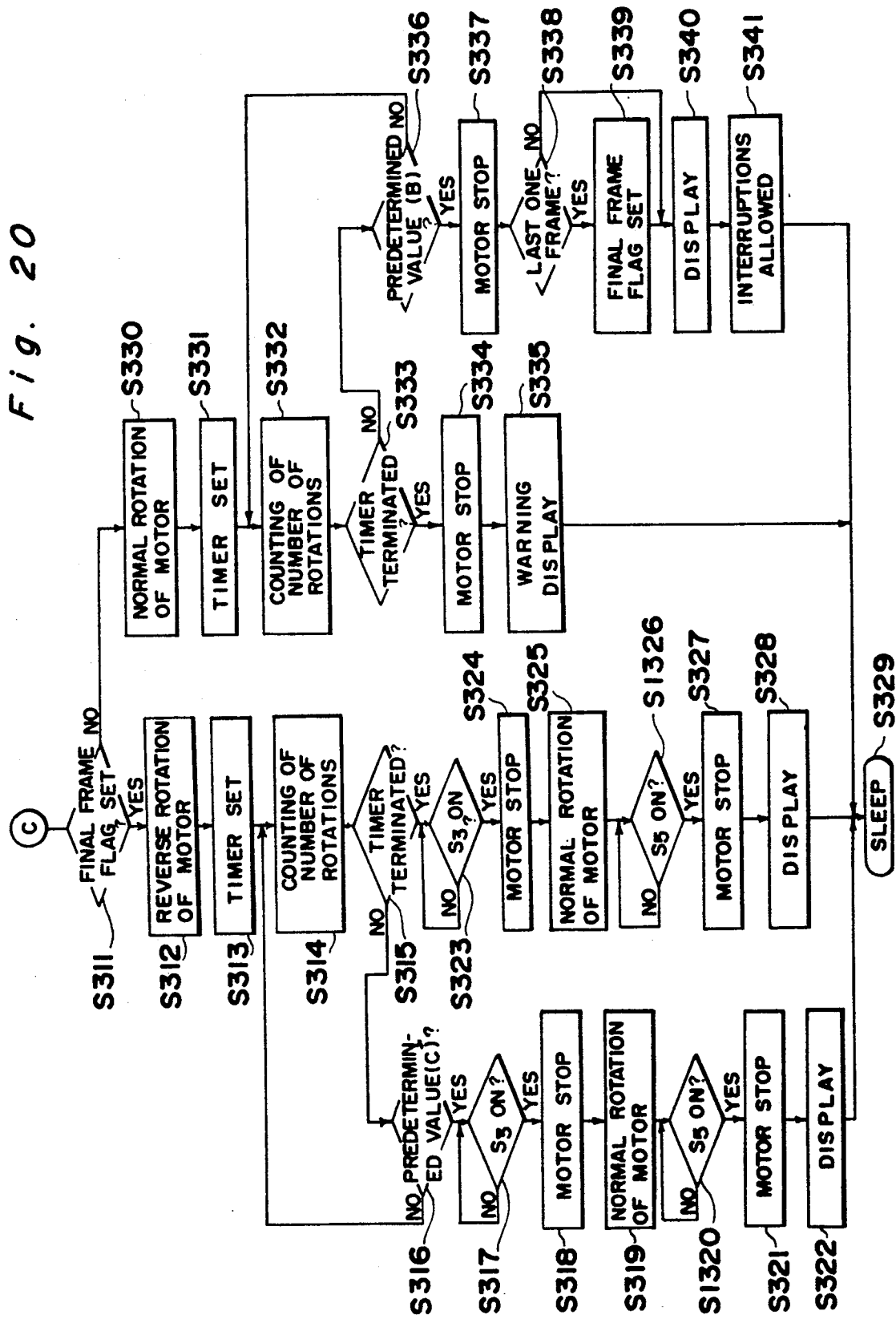
FIG. 20 is a flowchart showing the operation of a camera of another embodiment in accordance with the present invention

It is apparent that the present invention is not limited to the above-described embodiments. Various changes and modifications can be made. For example, another embodiment of the present invention is shown in FIG. 20. This embodiment is the same as the embodiment shown in FIG. 11B except steps S1320 and S1326. The difference between steps S1320 and S1326 and steps S320 and S326 is that the turning-on of the switch S4 is detected in the above-described embodiment while the turning-on of the switch S5 is detected in this embodiment.

As shown in FIG. 7 (b), the pattern PT1c composing the switch S5 is disposed on the substrate so that the pattern PT1c forms a predetermined angle θ (approximately 90° in FIG. 7 (b)) with the pattern PT1b composing the switch S4. Accordingly, as shown at steps S1320 and steps S1326 in FIG. 22, when the motor 101 is stopped upon the turning-on of the switch S5, the film rewinding shaft 22 of the film cartridge 39 stops at a position shifted by θ in respect of the condition before the film rewinding shaft 22 is accommodated in the camera body 31 (initial condition before use). Similarly to the above-described embodiment, when the film cartridge 39 is taken out of the cartridge accommodating chamber 40, the first fork 130 of the camera is returned to the initial rotational position by performing the execution of the interruption INT3 shown in FIG. 12.

Accordingly, the film cartridge 39 used cannot be smoothly accommodated in the camera body 31 because the phase of the film rewinding shaft 22 and that of the first fork 130 differ from each other by $\theta$. Then, unless the first fork 130 is pressed against the urging force of the coil spring 132, the film cartridge 39 cannot be accommodated in the camera body 31. Thus, the operator finds that the film used is erroneously being accommodated in the camera body 31. If the first fork 130 is constructed not to axially move, it is impossible to use the film used.

According to the above-described embodiment of the present invention, since the rewinding shaft 22 of the film cartridge 39 is set to take a predetermined phase position, the rotational phase position of the rewinding shaft 22 is constant and the rewinding shaft 22 can be easily connected to the rewinding driving mechanism of the camera body 31. Further, the rewinding driving mechanism of the camera body 31 is set to take a predetermined phase position correspondingly to the predetermined phase position of the rewinding shaft 22 by means of the first setting means having the switch $S_3$ and the substrate 111b, whereby the phase of the rewinding shaft 22 and the phase of the driving mechanism thereof coincide with each other when the film cartridge 39 is accommodated in the cartridge accommodating chamber 40. Accordingly, an operation for accommodating the film cartridge 39 can be promptly carried out and the occurrences of a malfunction and a failure can be effectively prevented.

Furthermore, in the film cartridge 39 provided with the sprocket 23 serving as the feeding-out member, the same advantage as the above can be obtained by setting the phase position of the sprocket 23 to take a predetermined phase position. In addition, in the camera 31 provided with the feeding-out driving mechanism, the phase of the feeding-out driving mechanism is set to take a predetermined phase position correspondingly to the phase position of the sprocket 23 by the second setting means provided with the switch $S_4$ and the substrate 110b etc., whereby the same advantage as the above can be obtained.

Although, in the above-described embodiment, the switches $S_3$, $S_4$, and $S_5$ are arranged and the rotational positions of the first folk and the second folk are controlled so that the first folk and the second folk are capable easily of engaging with the first engaging portion 22a and the second engaging portion 23a, respectively, it is possible to omit such a control operation in order to simplify the construction of the flow chart. That is, it is possible to employ a flow chart as shown in FIG. 21 instead of the flow chart as shown in FIG. 9 in the initializing operation.

Figure 21:
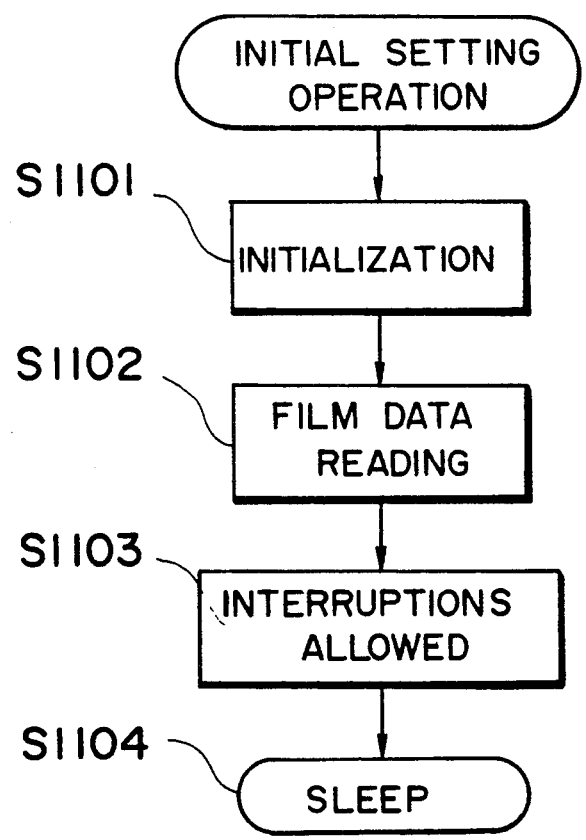
FIG. 21 is a flowchart showing the initializing operation of the camera according to other embodiment.

In the flow chart shown in FIG. 21, after turning-on of the power source, at step S1101, each input terminal and the memory circuit are set to the initial states. Sequentially, at step S1102, the information such as film sensitivity and the number of photographable frames is read from the film data 21d of the film cartridge 39 by the film data circuit FD. Then, after at step S1103, interruptions of the other operations are permitted, the initializing operation is completed at step S1104.

Figure 22:
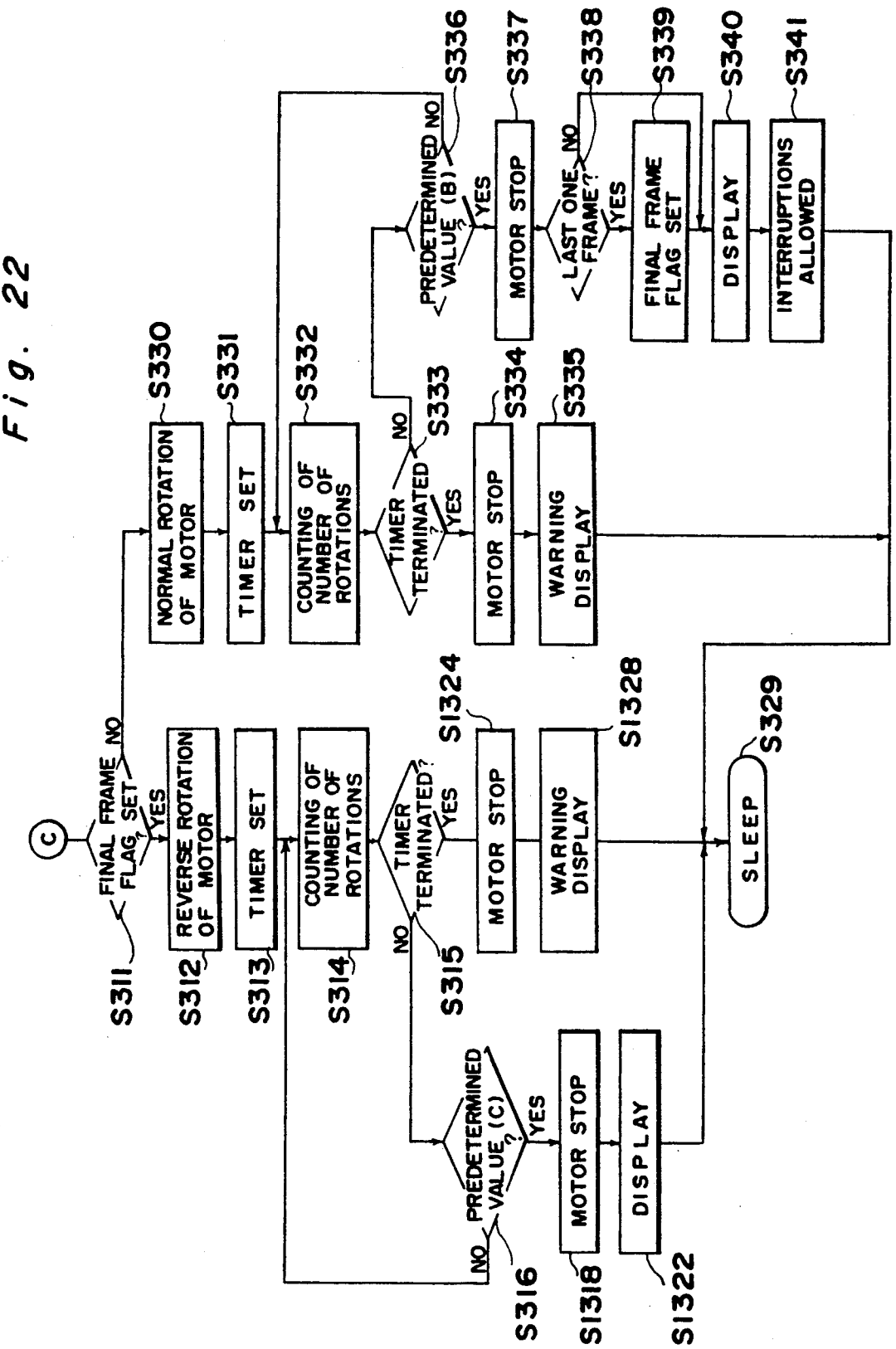
FIG. 22 is a flowchart showing the photographing operation, film winding operation, and film rewinding operation of the camera according to other embodiment which is different from FIG. 11B.
Figure 23:
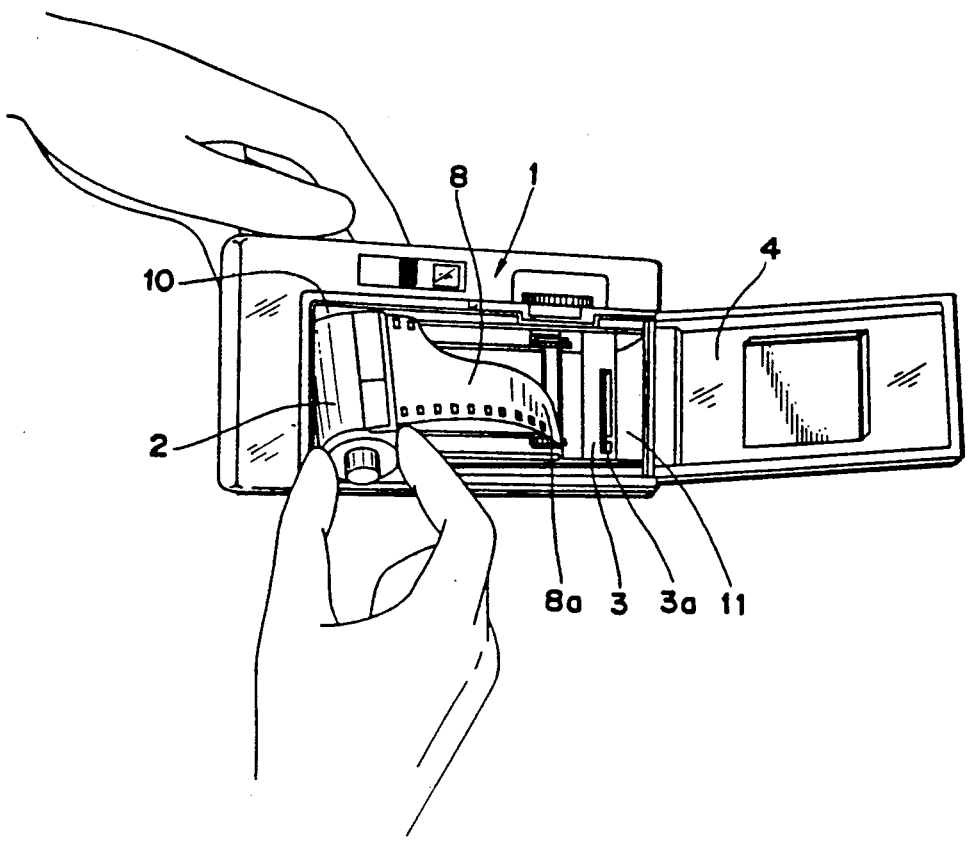
FIG. 23 is an illustration showing the condition in which a conventional 135-type film cartridge is being accommodated in a cartridge accommodating chamber.
Figure 24:
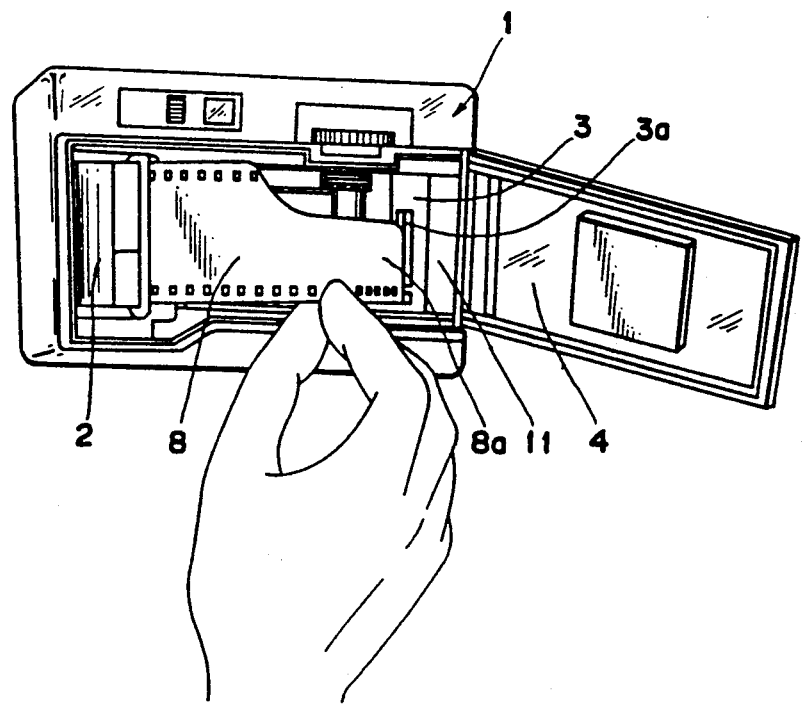
FIG. 24 is an illustration showing the condition in which the 135-type film cartridge has been accommodated in the cartridge accommodating chamber in FIG. 23 and thereafter an operator is connecting the leading portion of a film with a spool.
Figure 25:
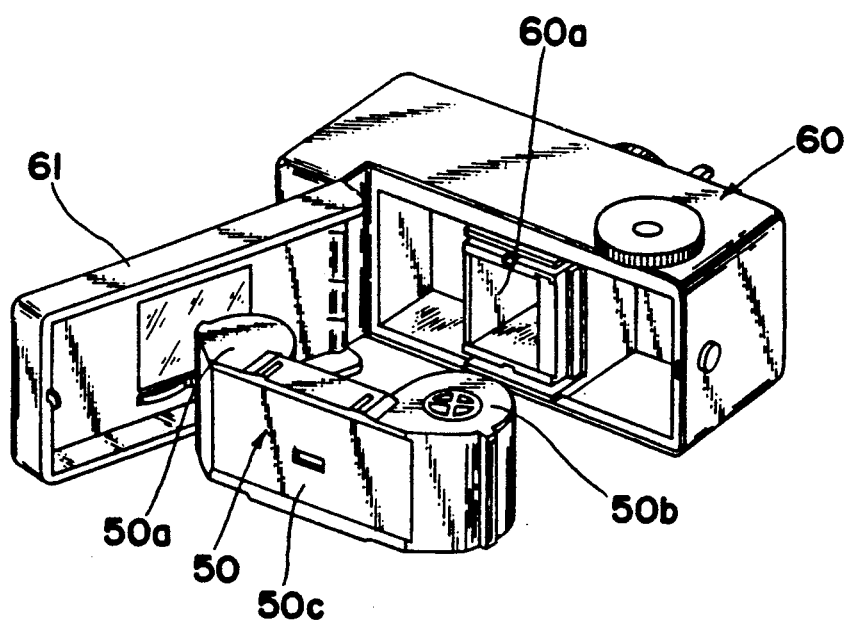
FIG. 25 is an illustration showing the condition in which the 110-type film cartridge is being accommodated in a cartridge accommodating chamber.

In this case, an operation after completion of photographing of the final frame as shown in FIG. 22 instead of that shown in FIG. 11B may be employed.

The operations at steps S311–S316 in FIG. 22 are the same as those at steps S311–S316 in FIG. 11B. That is, it is decided whether or not the timer set at step S313 is completed at step S315. If a decision is made that the timer is not completed, at step S316, it is decided whether or not the pulse number counted at step S314 reaches the predetermined value (C) corresponding to the amount of film 26 wound around the spool 41 according to the normal rotation of the motor 101.

If a decision is made at step S316 that the pulse number is smaller than the predetermined value (C), the program returns to step S314.

If a decision is made at step S316 that the pulse number reaches the predetermined value (C), i.e., if a decision is made that the frames of the film 26 are all rewound into the film cartridge 39, the motor 101 is stopped at step S1318. Next, at step S1322, the completion of the rewinding of the film 26 is displayed by the display device DS. Then, at step S329, the film rewinding operation is terminated.

In this case, similar to the above-described embodiment, after a decision is made that the pulse number reaches the predetermined value (C) at step S316, the motor 101 may be reversed for a predetermined period of time so that the perforation 26a of the film 26 disengages from the engaging claw of the sprocket 23 to rewind even the leading portion of the film 26 around the film rewinding shaft 22.

If a decision is made at step S318 that the timer set at step S313 is completed, i.e., a decision is made that the film 26 is not completely rewound by the film rewinding shaft 22 in the predetermined period of time due to the occurrence of an abnormality, the motor 101 is stopped at step S1324. Then, after a warning display is made by the display device DS at step S1328, the film rewinding operation is terminated at step S329.

The operations at after step S330 are the same as those at after step S330 in FIG. 11B.

According to the above construction, since in the above camera, the film cartridge 39 composed of only a portion for accommodating the film is employed, it is unnecessary to provide with a space for accommodating a film exposure supporting unit and a space for accommodating a spool chamber of the 110-type film cartridge. Therefore, it is not required to provide with an extra space behind the lens L or in the spool chamber, whereby the camera can be freely designed without great limitation of the model and kind of the camera.

Since in the above camera, the film cartridge 39 is composed of only a portion for accommodating the film and it is not required to provide with any extra space behind the lens or in the spool chamber similarly to the conventional 135-type film cartridge, the film cartridge accommodating chamber 40 can be smaller in construction as a whole, as compared with the chamber for accommodating the conventional 110-type film cartridge. Since the film cartridge 39 is less bulkier than the conventional 110-type film cartridge, the size of the film cartridge exit/entrance 43 of the camera for employing the film cartridge 39 can be smaller than that of the film cartridge exit/entrance required for a camera employing the 110-type film cartridge.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A film cartridge removably accommodated in a camera body of a camera, comprising:
    a film rewinding shaft having a first engaging portion capable of engaging with a film rewinding driving member of the camera body and rewinding a film therearound by rotation thereof together with the film rewinding driving member;
    a film feeding-out member having a second engaging portion capable of engaging with a film feeding-out driving member of the camera body, engaging with said film, and feeding out said film by rotation thereof together with the film feeding-out driving member; and
    a case having a film exit/entrance, rotatably accommodating therein said film rewinding shaft and said film feeding-out member, respectively, and accommodating therein said film rewound around said film rewinding shaft thereby in a light-intercepted condition.

2. A film cartridge as claimed in claim 1, wherein said film has perforations and said film feeding-out member is comprised of a sprocket which rotates while engaging with said perforations of said film.

3. A camera for use with a film cartridge of the type including a film rewinding shaft having a first engaging portion and a film feeding-out member, having a second engaging portion for engaging a film and feeding out said film; said camera comprising:
    a rewinding driving unit, for driving a film rewinding driving member that is capable of engaging with the first engaging portion of a film cartridge and rewinding the film by rotation of said film rewinding driving member;
    a film feeding-out driving unit for driving a film feeding-out driving member that is capable of engaging with the second engaging portion of a film cartridge and feeding the film by rotation of said film feeding-out driving member; and
    a film chamber for accommodating film fed out of said film cartridge.

4. A camera as claimed in claim 3, further comprising means for detecting a film transportation amount, wherein said detecting means detects said film transportation amount by detecting an amount that said film feeding-out driving member is driven.

5. A camera as claimed in claim 3, further comprising a film cartridge exit/entrance for allowing said film cartridge to axially enter or exit thereof.

6. A camera as claimed in claim 4, further comprising a film cartridge exit/entrance for allowing said film cartridge to axially enter or exit thereof.

7. A camera as claimed in claim 3, wherein said film cartridge has an asymmetrical cross-section around said film rewinding shaft, and said film cartridge accommodating chamber is so constructed that said film cartridge is inserted into said film cartridge accommodating chamber in only a predetermined direction.

8. A camera as claimed in claim 4, wherein said film cartridge has an asymmetrical cross-section around said film rewinding shaft, and said film cartridge accommodating chamber is so constructed that said film cartridge is inserted into said film cartridge accommodating chamber in only a predetermined direction.

9. A camera as claimed in claim 5, wherein said film cartridge has an asymmetrical cross-section around said film rewinding shaft, and said film cartridge is inserted into said film cartridge accommodating chamber in only a predetermined direction.

10. A film cartridge containing a roll of film, comprising:
    a housing, having an exit/entrance, for protecting said roll of film;
    a shaft rotatably mounted in said housing for driving said film to an outside of said housing through said exit/entrance; and
    means, provided in said housing, for locking said shaft in a rotary phase, wherein said locking means includes a member to be positioned at a first position for locking said shaft and to be positioned at a second position for releasing said shaft.

11. A film cartridge as claimed in claim 10, wherein said housing has a plane perpendicular to the shaft and the shaft includes a coupler to transmit rotation for driving said film to said outside of said housing, and wherein said member and said coupler are disposed on the plane and wherein said member and said coupler are exposed to the exterior of said housing.

12. A film cartridge containing a roll of film, comprising:
    a housing, having an exit/entrance, for protecting said roll of film;
    a shaft rotatably mounted in said housing for driving said film to an outside of said housing through said exit/entrance; and
    means, provided in said housing, for locking said shaft in a rotary phase, wherein said roll of film is completely contained in said housing when said film is unused.

13. A camera employing a film cartridge containing a roll of film,
    said film cartridge including a shaft which is rotatable to drive said film to an outside of said film cartridge, and means for locking said shaft in a rotary phase wherein said roll of film is completely contained in the film cartridge when said film is unused; and
    said camera including,
    means for forming a chamber for containing said film cartridge therein;
    means, including a release member, for releasing said shaft by means of engagement between said release member and said locking means; and
    means for rotating said shaft of said film cartridge contained in said chamber.

14. A camera as claimed in claim 13, said camera further comprising means for controlling engagement of said release member with said locking means in said chamber.

15. A camera as claimed in claim 14, said camera further comprising a lid movable between a closed position for protecting said chamber against exposure to light, and an opened position for allowing deposition of said film cartridge in said chamber, said controlling means controlling engagement of said release member with said locking means in accordance with said closed position of said lid.

16. A camera as claimed in claim 13, said camera further comprising:

a lid movable between a closed position for protecting said chamber against exposure to light and an opened position for allowing deposition of said film cartridge in said chamber; and means for locking said lid in said closed position, wherein a controlling means engages said release member with said locking means in response to operation of said lid locking means.

17. A camera as claimed in claim 13, wherein said rotating means and said release member are provided on a bottom of said chamber on an opposite side to a lid of the camera.

18. A film cartridge as claimed in claim 11 wherein the member is moved from the first position to the second position when a pin is plunged into said hole.

* * * * *